(12) United States Patent
Su et al.

(10) Patent No.: US 12,499,911 B2
(45) Date of Patent: Dec. 16, 2025

(54) VIDEO EDITING METHOD AND APPARATUS, COMPUTER DEVICE, STORAGE MEDIUM, AND PRODUCT

(71) Applicant: Tencent Technology (Shenzhen) Company Limited, Shenzhen (CN)

(72) Inventors: Pengcheng Su, Shenzhen (CN); Wenshuai Wang, Shenzhen (CN); Meihua Xie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 33 days.

(21) Appl. No.: 18/431,825

(22) Filed: Feb. 2, 2024

(65) Prior Publication Data
US 2024/0177739 A1 May 30, 2024

Related U.S. Application Data

(63) Continuation of application No. PCT/CN2023/086471, filed on Apr. 6, 2023.

(30) Foreign Application Priority Data

May 30, 2022 (CN) .......................... 202210603765.9

(51) Int. Cl.
G11B 27/031 (2006.01)
G06F 3/01 (2006.01)
G06T 11/60 (2006.01)

(52) U.S. Cl.
CPC ............ G11B 27/031 (2013.01); G06F 3/017 (2013.01); G06T 11/60 (2013.01)

(58) Field of Classification Search
CPC ........ G11B 27/031; G06F 3/017; G06T 11/60
See application file for complete search history.

(56) References Cited

U.S. PATENT DOCUMENTS

2009/0306985 A1    12/2009  Roberts et al.
2012/0301111 A1*   11/2012  Cordova .............. H04N 9/8205
                                                386/245

(Continued)

FOREIGN PATENT DOCUMENTS

CN    107770626 A    3/2018
CN    110163939 A    8/2019

(Continued)

OTHER PUBLICATIONS

Tencent Technology, ISR, PCT/CN2023/086471, Jun. 15, 2023, 2 pgs.

Primary Examiner — Thai Q Tran
Assistant Examiner — Jose M Mesa
(74) Attorney, Agent, or Firm — Morgan, Lewis & Bockius LLP

(57) ABSTRACT

This application provides a video editing method performed by a computer device. The video editing method includes: displaying a video editing interface; determining a target character and an input text in the video editing interface; generating an animated video and a line audio, the animated video comprising the target character, and the line audio corresponding to the text for the target character in the animated video; and synchronously playing the line audio corresponding to the text in a process of playing the animated video.

20 Claims, 38 Drawing Sheets

(56) References Cited

U.S. PATENT DOCUMENTS

| | | |
|---|---|---|
| 2016/0284382 A1 | 9/2016 | Luo |
| 2017/0109585 A1* | 4/2017 | Matias ............. H04N 21/44204 |
| 2019/0043240 A1* | 2/2019 | Finegold ............. G06F 3/04883 |
| 2022/0247919 A1* | 8/2022 | O'Leary ............. H04N 5/2628 |

FOREIGN PATENT DOCUMENTS

| | | |
|---|---|---|
| CN | 110781346 A | 2/2020 |
| CN | 110880198 A | 3/2020 |
| CN | 111601174 A | 8/2020 |
| CN | 113192161 A | 7/2021 |
| CN | 113923515 A | 1/2022 |
| CN | 114363691 A | 4/2022 |
| CN | 115115753 A | 9/2022 |
| CN | 115129212 A | 9/2022 |

\* cited by examiner

VIDEO EDITING METHOD AND APPARATUS, COMPUTER DEVICE, STORAGE MEDIUM, AND PRODUCT

CROSS-REFERENCE TO RELATED APPLICATIONS

This application is a continuation application of PCT Patent Application No. PCT/CN2023/086471, entitled "VIDEO EDITING METHOD AND APPARATUS, COMPUTER DEVICE, STORAGE MEDIUM, AND PRODUCT" filed on Apr. 6, 2023, which claims priority to Chinese Patent Application No. 202210603765.9, entitled "VIDEO EDITING METHOD AND APPARATUS, COMPUTER DEVICE, STORAGE MEDIUM, AND PRODUCT" and filed with the China National Intellectual Property Administration on May 30, 2022, all of which is incorporated herein by reference in its entirety.

FIELD OF THE TECHNOLOGY

This application relates to the field of computer technologies, and specifically, to a video editing method, a video editing apparatus, a computer device, a computer-readable storage medium, and a computer program product.

BACKGROUND OF THE DISCLOSURE

With the continuous development of computer technologies, there are various videos in every aspect of people's daily lives. Therefore, video creation and editing have also become a hot research topic in the video field. Currently, during video editing, a character usually requires to be manually aligned with a corresponding line text on a timeline. The operation is too cumbersome, resulting in low efficiency of video editing. Therefore, how to improve the efficiency of video editing is a technical problem that urgently needs to be resolved.

SUMMARY

Embodiments of this application provide a video editing method and apparatus, a device, and a computer-readable storage medium, to easily generate an animated video, thereby improving efficiency of video editing.

According to an aspect, embodiments of this application provide a video editing method, performed by a computer device, the method including:
  displaying a video editing interface;
  determining a target character and an input text in the video editing interface;
  generating an animated video and a line audio, the animated video comprising the target character, and the line audio corresponding to the text for the target character in the animated video; and
  synchronously playing the line audio corresponding to the text in a process of playing the animated video.

According to another aspect, embodiments of this application provide a computer device, including a memory and a processor, the memory storing a computer program, the computer program, when executed by the processor, causing the processor to perform the video editing method.

According to another aspect, embodiments of this application provide a non-transitory computer-readable storage medium, storing a computer program, the computer program, when read and executed by a processor of a computer device, causing the computer device to perform the video editing method.

DESCRIPTION OF EMBODIMENTS

The technical solutions in embodiments of this application are clearly and completely described in the following with reference to the accompanying drawings in embodiments of this application. Apparently, the described embodiments are merely some rather than all of embodiments of this application. All other embodiments obtained by a person of ordinary skill in the art based on embodiments of this application without making creative efforts shall fall within the protection scope of this application.

This application mainly involves a text-to-speech (TTS) technology including a natural language processing (NLP) technology. A line text collected by a terminal device (running a client, where the client may be specifically, for example, a video client) is converted into speech information, so that when an edited animated video is played, the speech information corresponding to the line text is played for a user to watch and listen to. In other words, in this application, conversion between text information and the speech information may be implemented through the natural language processing technology.

Embodiments of this application provide a video editing solution, which may display a video editing interface; then, a target character and an input text may be determined in the video editing interface, where the input text is presented in the form of a text line in the video editing interface, and editing of the text in the text line is supported; and next, an animated video may be generated. The animated video includes the target character, and the target character outputs a line audio corresponding to a text in the animated video. In a process of playing the animated video, the line audio corresponding to the text is synchronously played when an image including the target character is played. It may be learnt that in this application, by selection one character and inputting one text, an animated video may be generated. In addition, the input text is presented in the video editing interface in the form of the text line, and editing operation may be performed on the text in the form of a document, and the operation is simple and convenient; and an association between the character and the text may be automatically established, so that when an image of the target character is displayed, the target character may read the line audio corresponding to the text. Compared with manually aligning the character and the line, in this application, the character may be automatically associated with the line, thereby improving efficiency of video editing.

Figure 1:
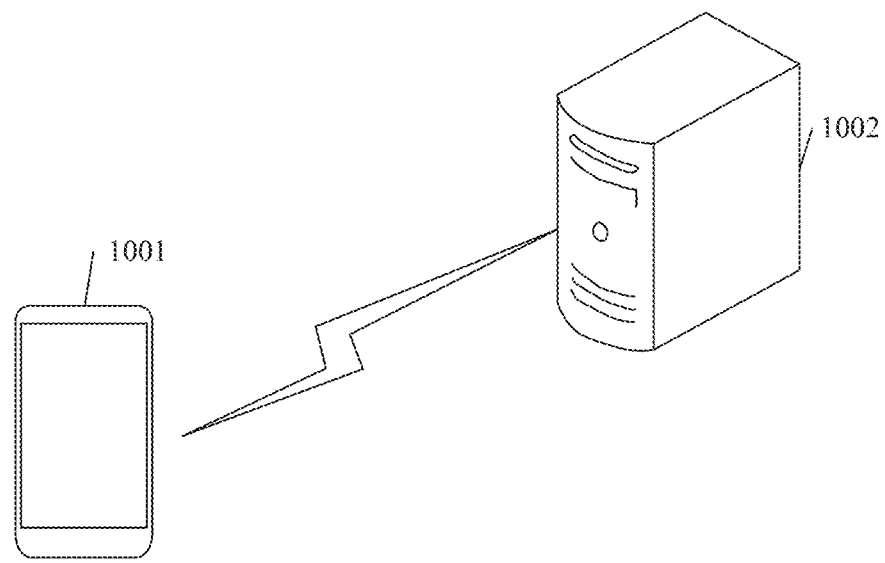
FIG. 1 is a schematic diagram of a structure of a video editing system according to an embodiment of this application.

Next, the video editing system provided in this application is introduced with reference to the foregoing video editing method. FIG. 1 is a schematic diagram of a structure of a video editing system according to an embodiment of this application. As shown in FIG. 1, the video editing system may include at least a terminal device 1001 and a server 1002.

The terminal device 1001 in the video editing system shown in FIG. 1 may include but is not limited to a smartphone, a tablet computer, a laptop computer, a desktop computer, a smart speaker, a smart television, a smart watch, a vehicle-mounted terminal, a smart wearable device, and the like, and is often equipped with a display apparatus. The display apparatus may be a monitor, a display screen, a touch screen, and the like, and the touch screen may be a touch control screen, a touch panel, and the like.

The server 1002 in the video editing system shown in FIG. 1 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

In a possible implementation, the terminal device 1001 runs a client, such as a video client, a browser client, an information flow client, a game client, and the like. In embodiments of this application, the video client is used as an example for description. The terminal device 1001 may display a user interface (UI) interface to the user in the video client. For example, the UI interface is a Flutter interface. Flutter is a mobile UI interface framework, which may quickly build a high-quality native user interface on an operating system. The Flutter page may be, for example, a video editing interface, and may be configured to display an animated video. The server 1002 may be configured to provide the terminal device 1001 with a video material (for example, information such as an identifier of a character, a background, a face posture (expression), and a body action) required in a video editing process.

Next, with reference to the video editing solution mentioned above in this application, an exchange process between the terminal device 1001 and the server 1002 is described.

(1) First, the terminal device 1001 may display the video editing interface.
(2) Next, the user may determine a target character in the video editing interface. A determining manner of the target character may be added after triggering a character adding entry set in the video editing interface, or may be any character selected from a historical video displayed in the video editing interface. After determining the target character, the terminal device 1001 may send a character information obtaining request to the server 1002.
(3) The server 1002, in response to the character information obtaining request sent by the terminal device 1001, obtains configuration information (such as an identifier and a name of the target character, and the like) of the target character, and sends the configuration information of the target character to the terminal device 1001.
(4) The terminal device 1001 receives the configuration information (such as an identifier and a name of the target character, and the like) of the target character sent from the server 1002, and displays the target character in the video editing interface.
(5) Further, the user may further enter a text in the video editing interface. After entering the text, the terminal device 1001 may send a data conversion request to the server 1002, where the data conversion request is configured for converting the text into a line audio.
(6) In response to the data conversion request sent by the terminal device 1001, the server 1002 converts the text into a corresponding line audio through the TTS technology, where the line audio may be, for example, an mp3 (MPEG-1 AudioLayer-3, a high-performance sound compression encoding format) file, and sends the line audio (for example, the mp3 file) corresponding to the text to the terminal device 1001.
(7) After receiving the line audio (such as the mp3 file) returned by the server 1002, the terminal device 1001 may generate an animated video. In a possible implementation, the animated video may be further played in the video editing interface. In a process of playing the animated video, when an image of the target character is displayed, the mp3 file may be loaded to drive the line audio corresponding to the text to be synchronously played when the image of the target character is presented. In other words, the target character is controlled to synchronously read the line audio corresponding to the text.

Figure 2:
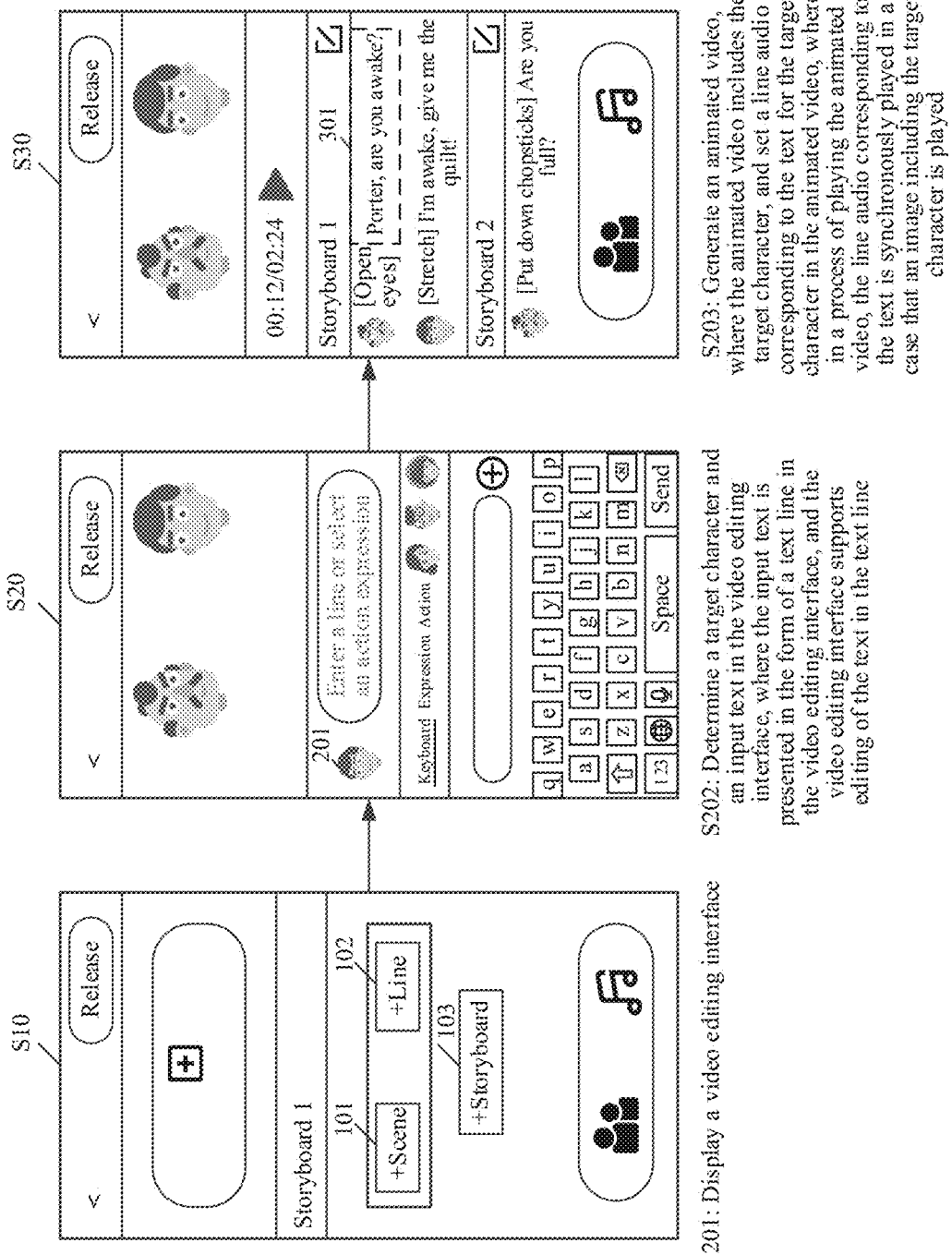
FIG. 2 is a schematic flowchart of a video editing method according to an embodiment of this application.

Next, the video editing method provided in embodiments of this application is described in detail with reference to the accompanying drawings. FIG. 2 is a schematic flowchart of a video editing method according to an embodiment of this application. In this embodiment, the video editing method may be performed by a computer device, and the computer device may be the terminal device 1001 in the video editing system shown in FIG. 1. As shown in FIG. 2, the video editing method may include the following step S201 to step S203:

S201: Display a video editing interface.

In embodiments of this application, the video editing interface may be an interface running in a video client configured to edit a video. For example, the video editing interface may be an interface configured to newly create a video; and for another example, the video editing interface may also be an interface configured to modify and update a historical video.

For example, the video editing interface may be shown as the interface S10 as shown in FIG. 2. The video editing interface S10 may include a plurality of function items, such as a scene adding function item 101, a text adding function item 102, a storyboard adding function item 103, and the like. The scene adding function item 101 is configured to add a background image; the text adding function item 102 is configured to select a character, and add a corresponding text to the character; and the storyboard adding function item 103 is configured to add a new storyboard, where at least one storyboard may constitute an animated video. In one embodiment, the video editing interface S10 may further include a character adding entry, and a new character may be added through the character adding entry.

Figure 3A:
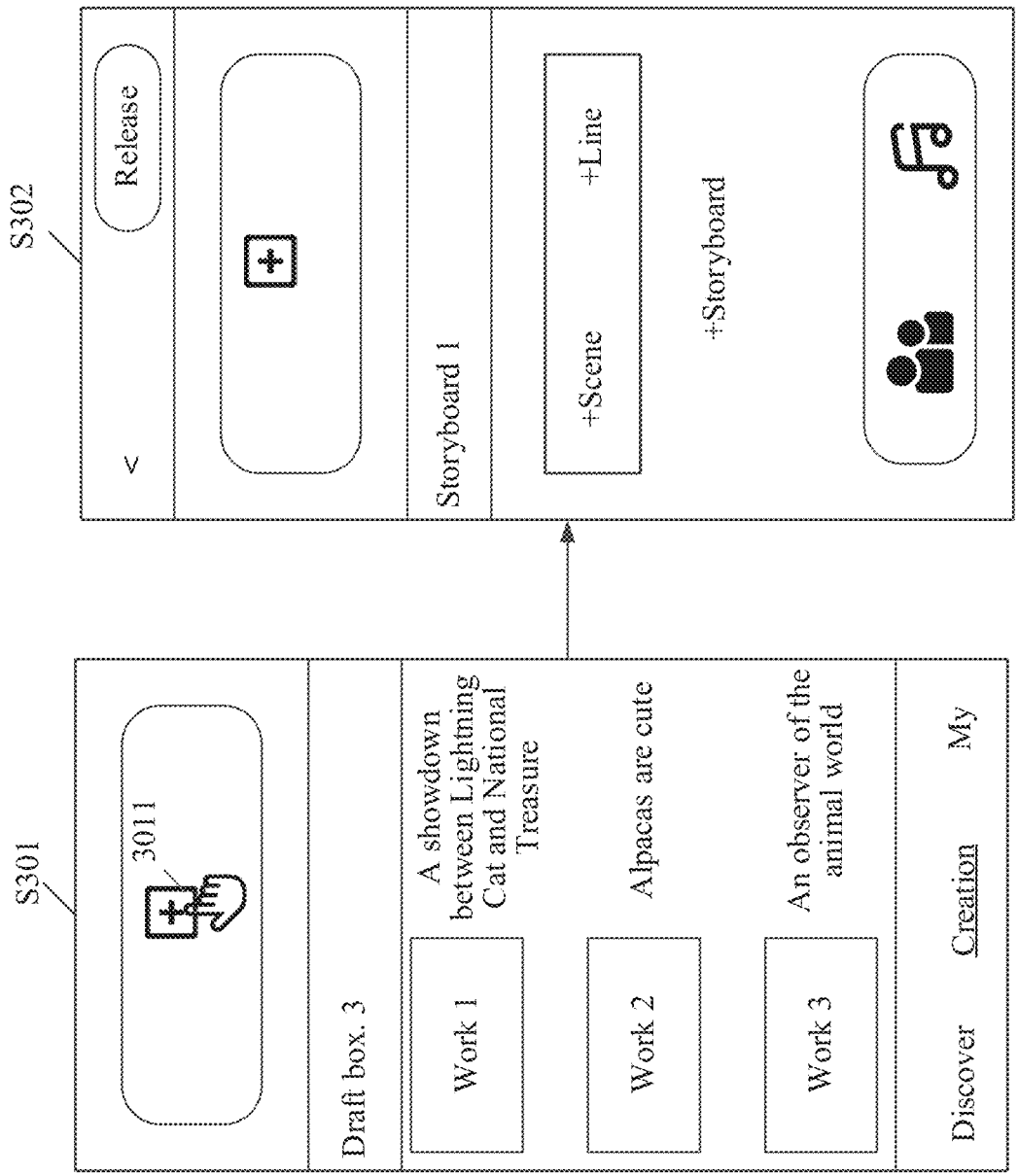
FIG. 3A is a schematic diagram of a scene of displaying a video editing interface according to an embodiment of this application.

In a possible implementation, the video editing interface may be entered through a creation homepage of the video client. FIG. 3A is a schematic diagram of a scene of displaying a video editing interface according to an embodiment of this application. As shown in FIG. 3A, the interface S301 is the creation homepage of the video client. A video editing entry 3011 is set in the creation homepage S301. After the user clicks on the video editing entry 3011, the video editing interface S302 is displayed.

S202: Determine a target character and an input text in the video editing interface, where the text is presented in the form of a text line in the video editing interface, and the video editing interface supports editing of the text in the text line.

For example, as shown in the video editing interface S20 in FIG. 2, a target character may be selected in the video editing interface S20. For example, the target character may be 201, and then a corresponding text may be input for the target character 201 in the video editing interface S20. The so-called text line refers to arranging the entered text in a line-by-line format. For example, the entered text includes N characters, and N is a positive integer. Then, the N words are sequentially arranged from left to right, to form a text line. For example, the text entered by the user in the video editing interface S20 is "Porter, are you awake?", thereby presenting the corresponding text line (as shown in 310) in the video editing interface S30. In the video editing interface, a maximum quantity of characters may be further set in one text line. If the entered text is 20 characters, and the maximum quantity of characters corresponding to one text line is 10 characters, the entered text is displayed as two text lines in the video editing interface.

In the foregoing manner, the text entered in the video editing interface is presented in the form of a text line. If the text needs to be edited (for example, operations such as adding, deleting, modifying, and the like), a corresponding editing operation may also be directly performed on the corresponding text line presented in the video editing interface. The text exchange manner is simple and convenient to operate.

Next, related processes such as how to determine the target character and the input text are separately described in detail.

First, a related process of how to determine the target character is described in detail.

In a possible implementation, the target character is added to the video editing interface. Specifically, that determining the target character in the video editing interface may include: triggering addition of the target character in the video editing interface when a character adding event is detected. The character adding event is generated by triggering a character adding entry; or the character adding event is generated after a character adding gesture is detected, and the character adding gesture includes: any one of a single clicking gesture, a double clicking gesture, a floating gesture, and a preset gesture.

Specifically, the character adding entry is set in the video editing interface. The triggering addition of the target character in the video editing interface when a character adding event is detected may include: outputting a character selection panel in response to the character adding entry being triggered, where at least one to-be-selected character identifier is displayed in the character selection panel; and displaying, in response to a selection operation on a target character identifier, the target character corresponding to the target character identifier in the video editing interface. The character adding entry may be a first-level entry or a second-level entry. The so-called first-level entry refers to an entry that may be directly displayed in the video editing interface. The so-called secondary entry refers to an entry that is not directly displayed in the video editing interface, namely, an entry that is displayed by triggering other entries or interfaces.

Figure 3B:
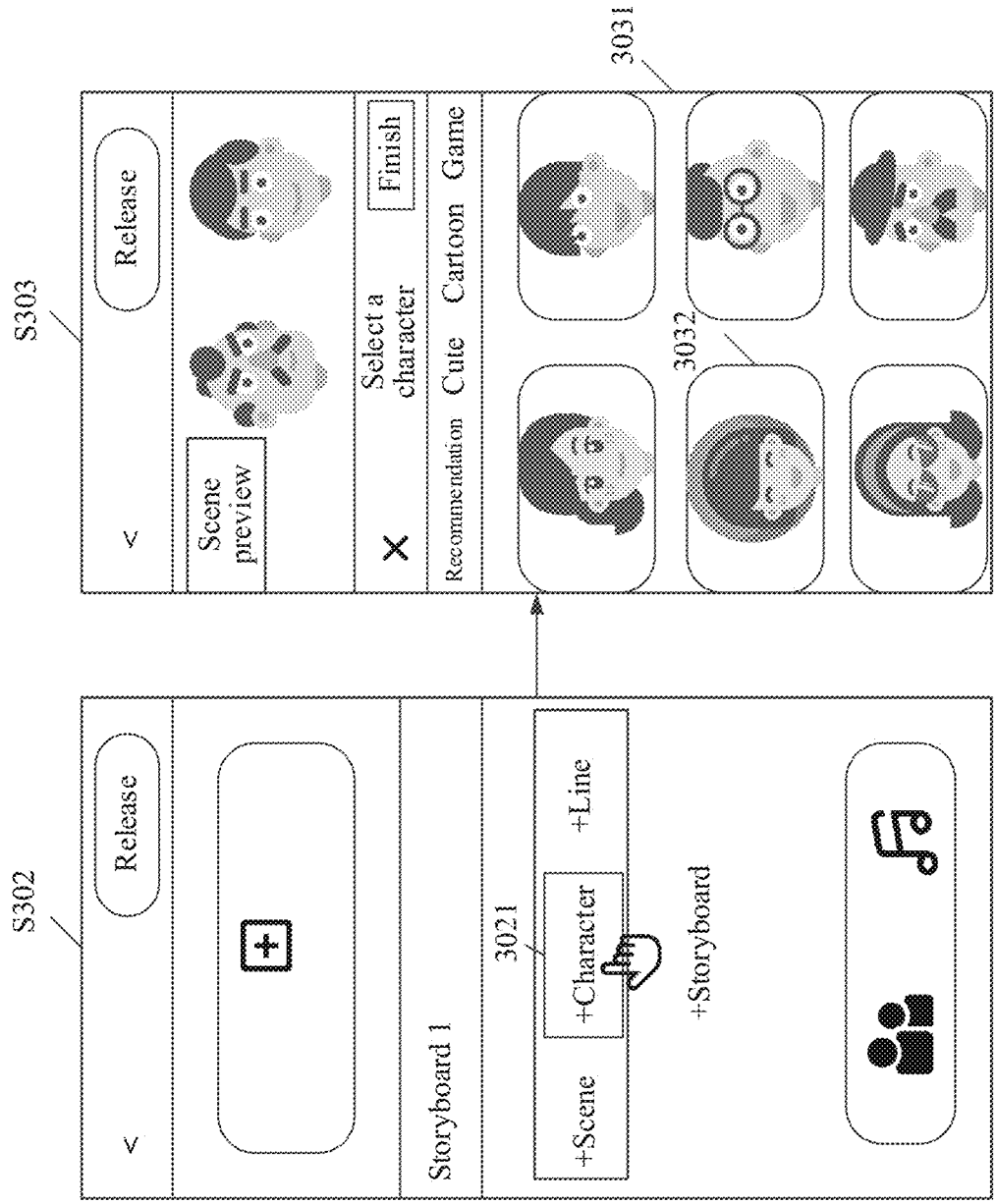
FIG. 3B is a schematic diagram of an interface of determining a target character according to an embodiment of this application.

For example, FIG. 3B is a schematic diagram of an interface of determining a target character according to an embodiment of this application. As shown in FIG. 3B, a character adding entry 3021 is set in the video editing interface S302. After clicking on the character adding entry 3021, a character selection panel may be output. The character selection panel may be a separate interface independent of the video editing interface, or the character selection panel and the video editing interface may also be in the same interface. For example, the character selection panel may be a window 3031 in the interface S303. Then, a character corresponding to any character identifier (for example, 3032) may be selected as a target character in the character selection panel 3031.

Figure 3C:
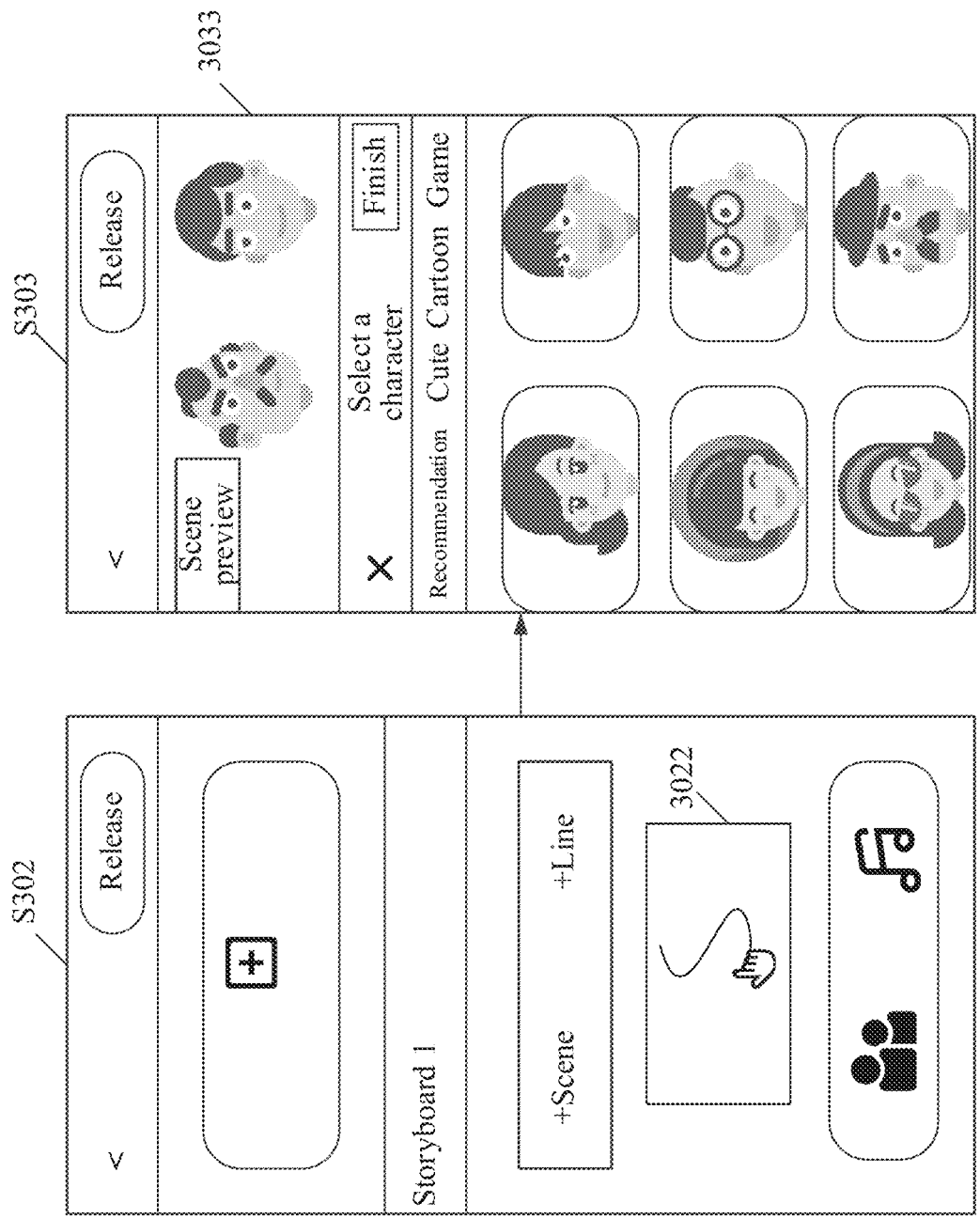
FIG. 3C is a schematic diagram of another interface of determining a target character according to an embodiment of this application.

For another example, FIG. 3C is a schematic diagram of another interface of determining a target character according to an embodiment of this application. As shown in FIG. 3C, an operation area 3022 is set in the video editing interface S302. A user may draw a character adding gesture in the operation area 3022, for example, draw an "S"-shaped gesture, which may trigger output of the character selection panel 3031.

In another possible implementation, the target character is selected from the historical video. Specifically, a plurality of historical videos are displayed in the video editing interface, and any historical video includes at least one character. That determining the target character in the video editing interface includes: selection any character from a historical video to determine the character as the target character.

Figure 3D:
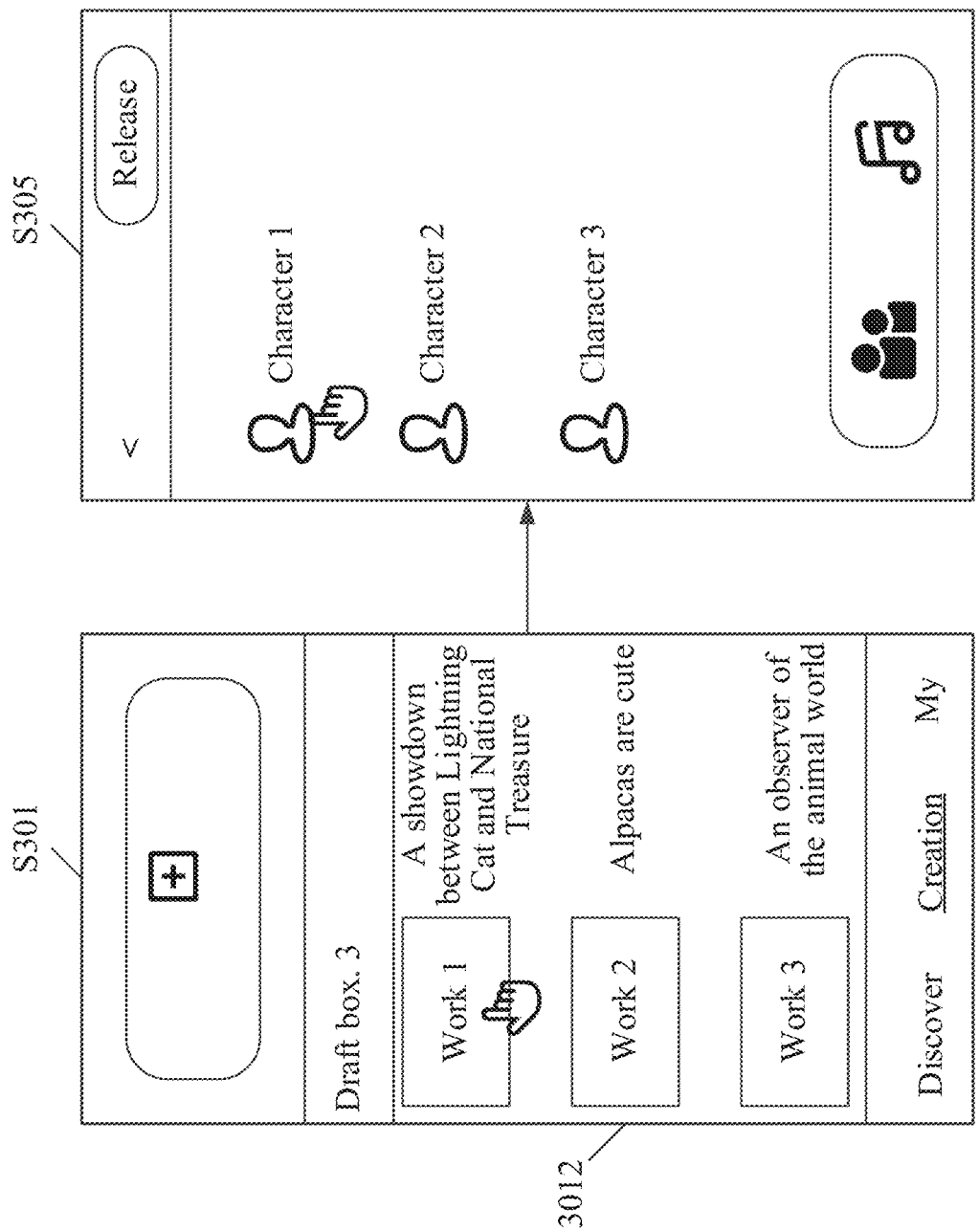
FIG. 3D is a schematic diagram of another interface of determining a target character according to an embodiment of this application.

For example, FIG. 3D is a schematic diagram of another interface of determining a target character according to an embodiment of this application. As shown in FIG. 3D, the video editing interface S301 includes a historical video display area 3012. The historical video display area 3012 displays a plurality of historical videos (for example, a work 1, a work 2, and a work 3). If the work 1 is selected, at least one character (for example, a character 1, a character 2, and a character 3) included in the work 1 may be displayed in the interface S305. For example, the character 1 displayed in the interface S305 may be selected as a target character.

In a possible implementation, the video editing interface includes a preview area. In a process of selecting the target character, a character selected each time is displayed in the preview area, and the character displayed in the preview area is replaced as the selection operation is switched; and the target character is presented in the preview area when the target character is selected. As shown in FIG. 3C, the preview area 3033 included in the video editing interface may display the character selected each time for the user to preview.

Figure 3E:
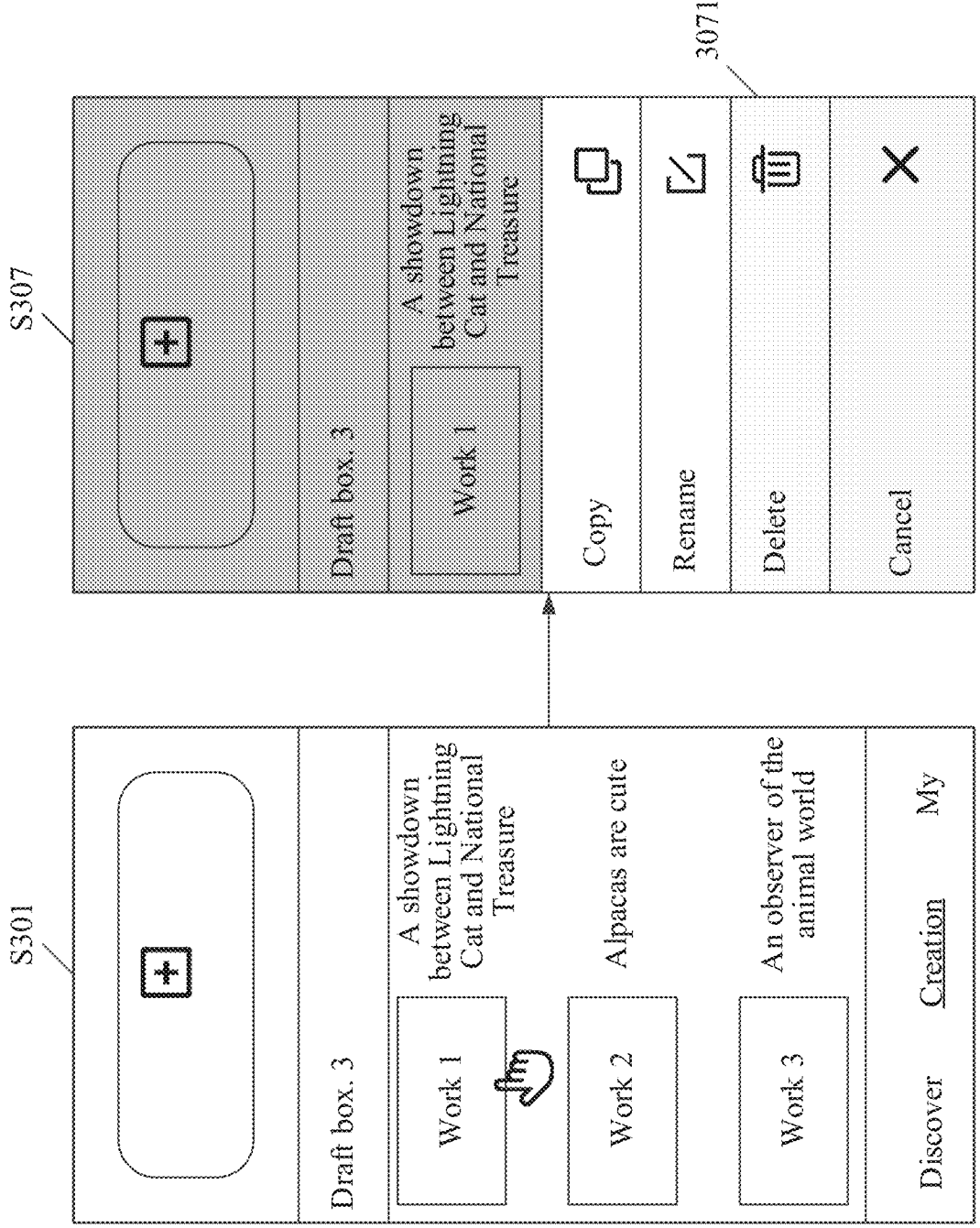
FIG. 3E is a schematic diagram of an interface of editing a historical video according to an embodiment of this application.

Any historical video displayed in the video editing interface supports being edited. FIG. 3E is a schematic diagram of an interface of editing a historical video according to an embodiment of this application. As shown in FIG. 3E, a plurality of historical videos (a work 1, a work 2, and a work 3) are displayed in the video editing interface S301. When the work 1 is clicked, a menu bar for the work 1 may be output, as shown in 3071 in the video editing interface S307. The menu bar 3071 displays a plurality of function items such as a copying function item, a renaming function item, and a deleting function item. The copying function item may be configured to perform copying operation on the work 1, the renaming function item may be configured to modify a name of the work 1, and the deleting function item may be configured to perform deleting operation on the work 1.

Figure 3F:
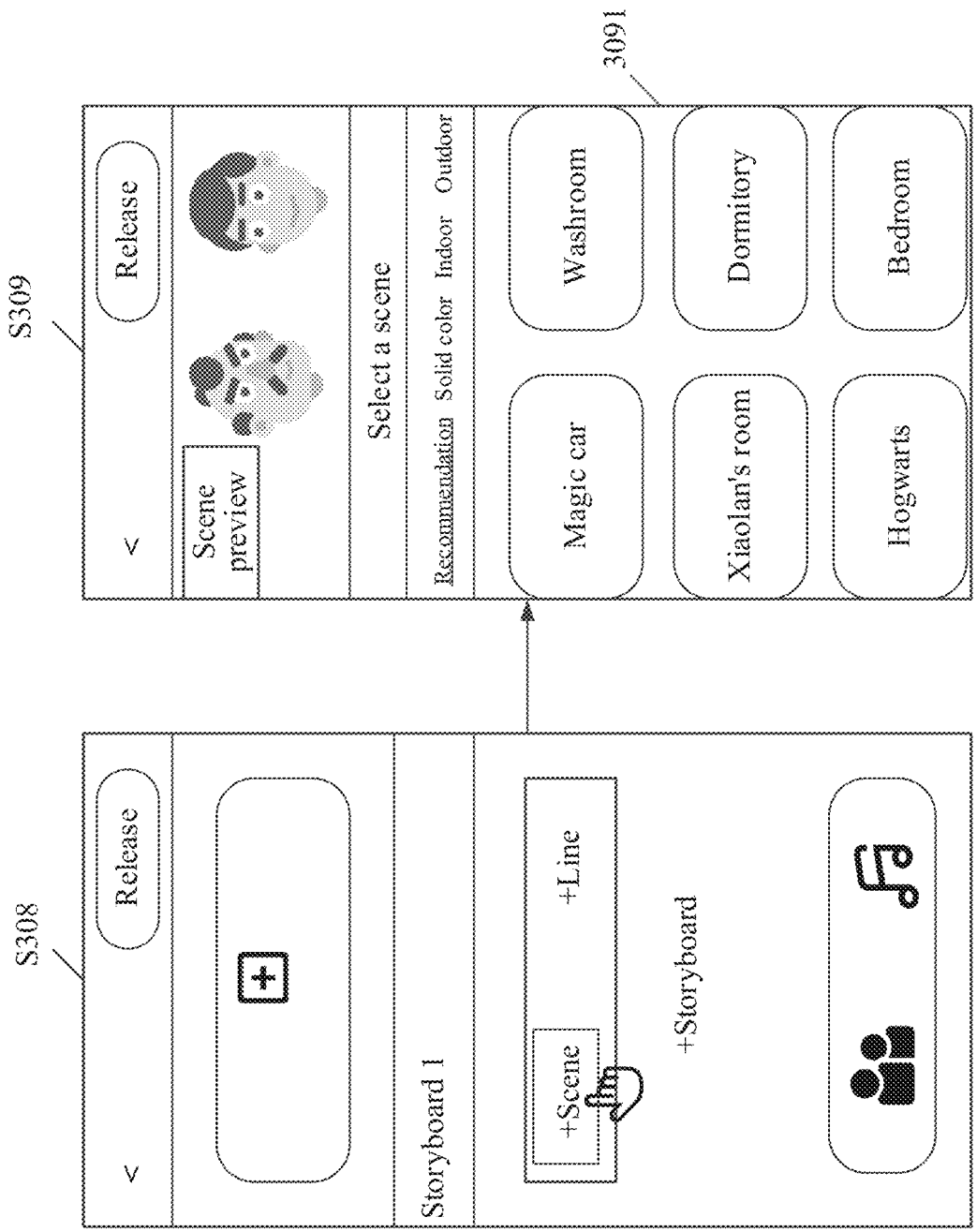
FIG. 3F is a schematic diagram of an interface of setting a background according to an embodiment of this application.

In addition, before selection the target character, a corresponding background may be further set for the selected target character. FIG. 3F is a schematic diagram of an interface of setting a background according to an embodiment of this application. As shown in FIG. 3F, by clicking on the scene adding function item in the video editing interface S308, the scene selection panel may be output, as shown by 3091 in the video editing page S309. The scene selection panel 3091 displays at least one to-be-recommended scene image for the user to freely select. Further, the scene selection panel 3091 may further include different types of scene images, such as a solid color type, an indoor type, an outdoor type, and the like.

Materials corresponding to a plurality of character identifiers displayed on the character selection panel and materials corresponding to a plurality of scene images displayed on the scene selection panel may be provided by a third-party platform. Through an open panel design of the materials, more third-party design developers participate in material creation in the future, so that there are an inexhaustible variety of scene images and characters for a video creator to use.

Then, related processes of how to enter the corresponding text for the target character and set posture data is described in detail.

Figure 4:
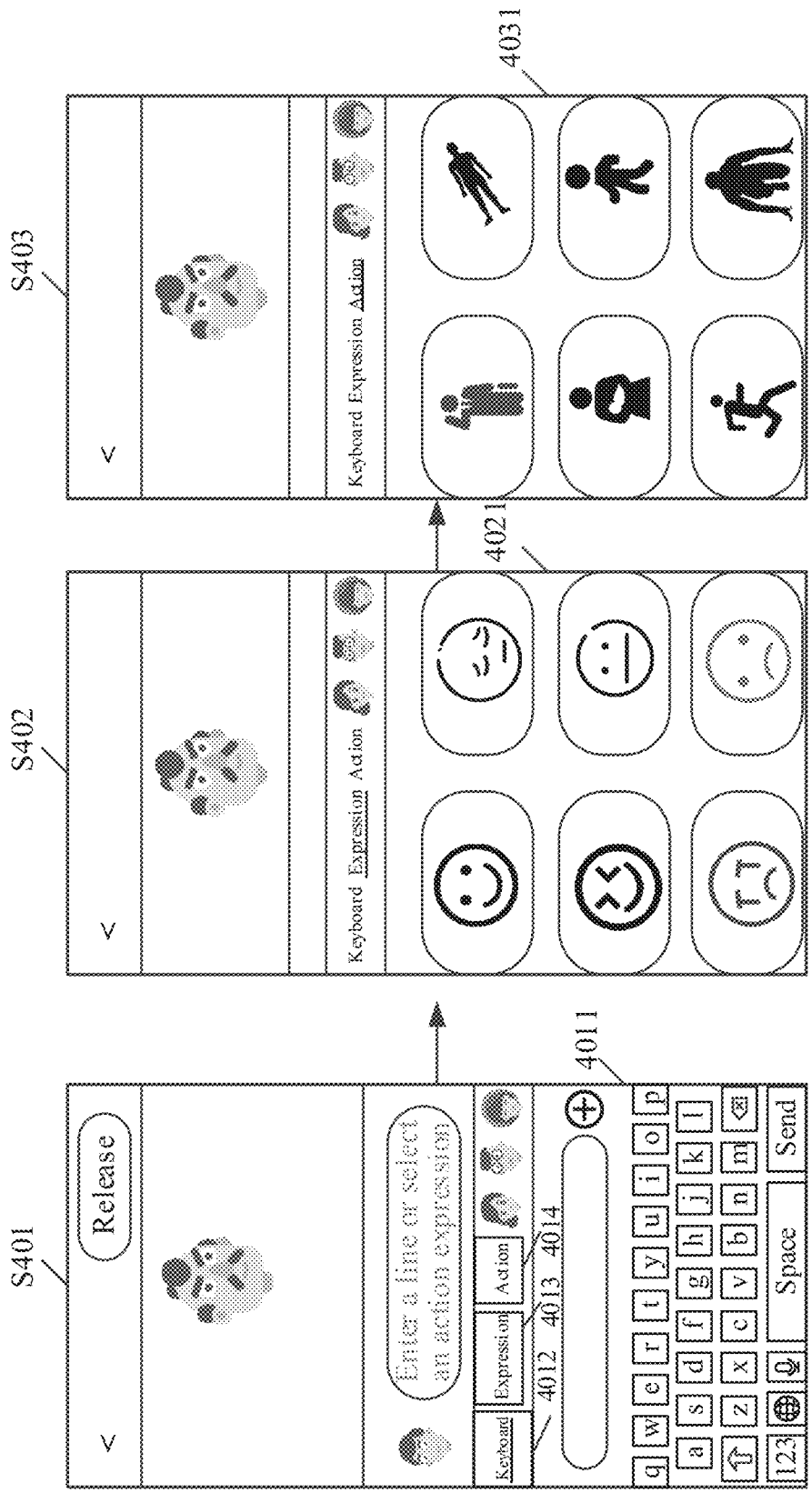
FIG. 4 is a schematic diagram of an interface of setting posture data according to an embodiment of this application.

After selection the target character, the corresponding text may be entered and the posture data may be set for the target character. FIG. 4 is a schematic diagram of an interface of setting posture data according to an embodiment of this application. As shown in FIG. 4, an attribute editing area 4011 for a target character is displayed in the video editing interface S401. The attribute editing area 4011 may include at least one attribute editing item, such as a text editing item 4012, an expression editing item 4013, and an action editing item 4014. The text editing item 4012 may be clicked, then a keyboard pops up, and the user may enter a text through the keyboard. For example, the entered text may be: "Are you happy today?" Then, the expression editing item 4013 may also be clicked, to display an expression candidate bar 4021. A plurality of expressions are displayed in the expression candidate bar 4021, and each expression may be configured for controlling the target character to present corresponding face postures in an animated video. For example, the face postures may include: happy, sad, crying, laughing, and the like. In addition, the action editing item 4014 may also be clicked, to display an action candidate bar

4031. A plurality of actions are displayed in the expression candidate bar 4021. Each action may be configured for controlling the target character to perform a corresponding body actions in the animated video. For example, the body actions may include: lying down, waving, rotating, jumping, and the like.

In embodiments of this application, the target characters included in the animated video may refer to a person, an animal, an object, and the like, and types of the target characters may include but are not limited to: cartoon, animation, a real person, and the like.

In this manner, after selection a target character, the corresponding text may be entered for the target character. In addition, posture data may be set for the target character through the expression function item and the action function item, to control the posture of the target character presented in the animated video. The posture may include any one or more of the face postures and the body actions. In this way, the target character also shows rich face postures and body actions in a process of expressing text content, thereby improving fun and expressiveness of the animated video.

S203: Generate an animated video, where the animated video includes the target character, and set a line audio corresponding to the text for the target character in the animated video, where in a process of playing the animated video, the line audio corresponding to the text is synchronously played when an image including the target character is played.

Specifically, the generated animated video may be displayed in the video editing interface S30. The line audio corresponding to the text is set for the target character in the animated video, so that in a process of playing the animated video, when the image including the target character is played, the line audio is output for the target character, that is, the line audio corresponding to the text is synchronously played. A visual effect achieved is that the target character reads the text corresponding to the line audio. It may be understood that the animated video may include at least one character. For each character, for a specific process of inputting the text and setting the corresponding posture data, refer to the process set for the target character in step S202, which is not described again in embodiments of this application.

In a possible implementation, posture data is further set for the target character. The video editing interface includes a preview area and a script display area. The preview area may be configured for displaying the target character, and the script display area may be configured for displaying the text and the posture data.

Figure 5A:
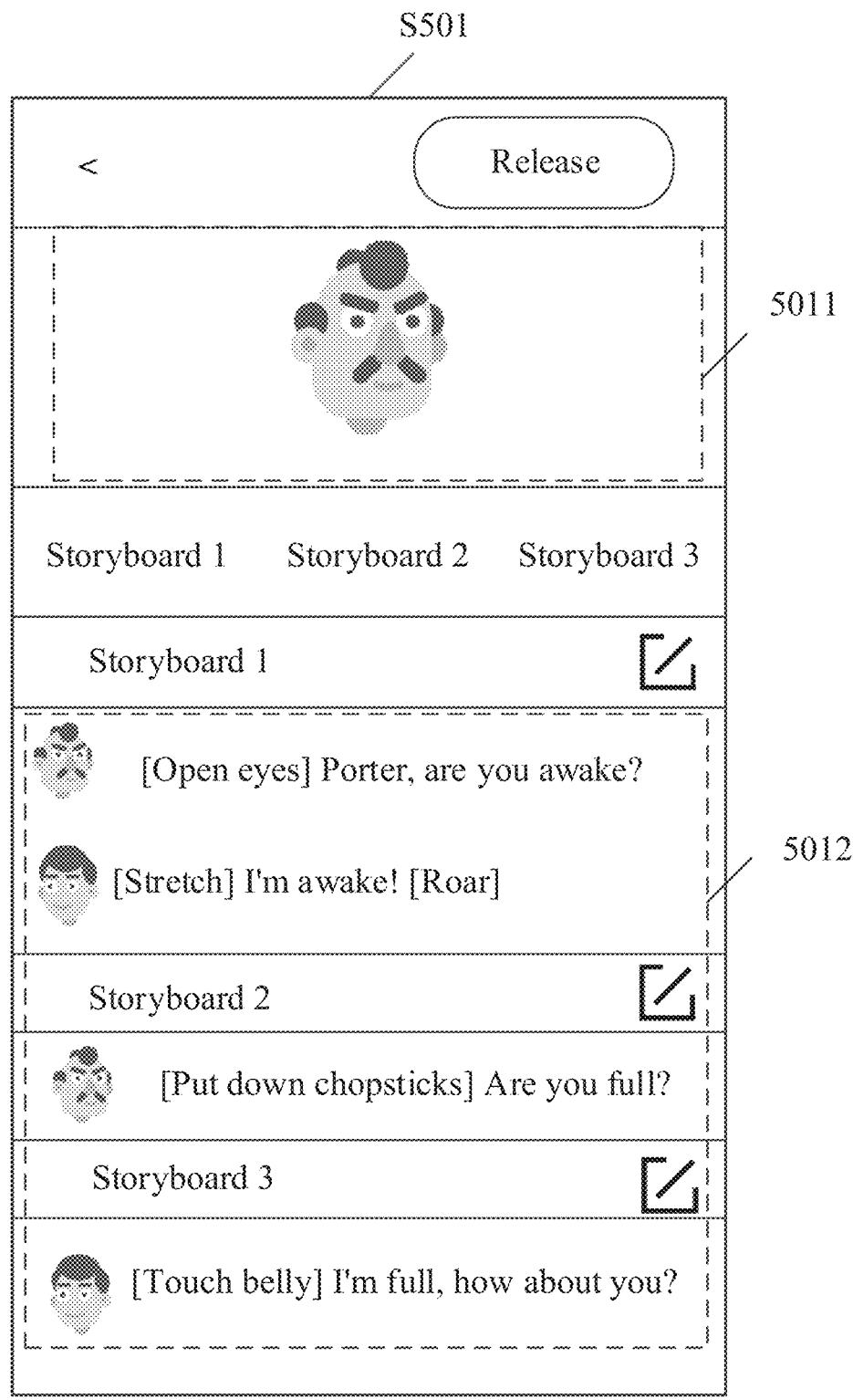
FIG. 5A is a schematic diagram of a video editing interface according to an embodiment of this application.

For example, FIG. 5A is a schematic diagram of a video editing interface according to an embodiment of this application. As shown in FIG. 5A, the video editing interface S501 may include a preview area 5011 and a script display area 5012. A target character may be displayed in the preview area 5011, and the script display area 5012 may be configured for displaying a text and posture data set for the target character. For example, the script display area 5012 may display: [Open eyes] (posture data) Porter, are you awake? (text).

Next, a process of playing a generated animated video is described in detail.

In a possible implementation, the animated video is played, a line audio is played when an image including the target character is played. Specifically, a text in the image including the target character is highlighted in a process of playing the line audio. The highlighting includes any one or more of the following: font enlarging display, font color changing display, and displaying according to a preset font.

Figure 5B:
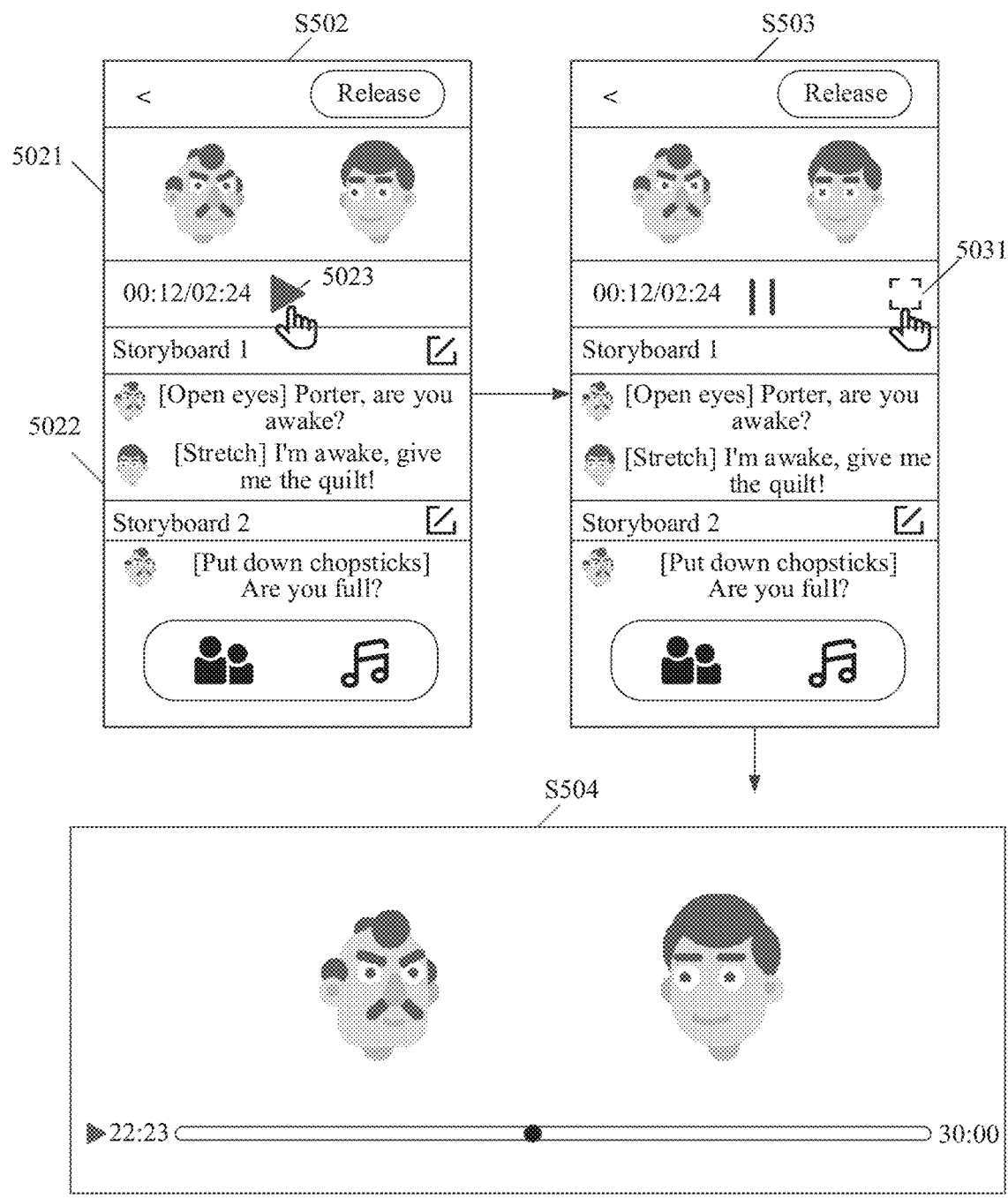
FIG. 5B is a schematic diagram of an interface of playing an animated video according to an embodiment of this application.

Specifically, the animated video may be played in the video editing interface. FIG. 5B is a schematic diagram of an interface of playing an animated video according to an embodiment of this application. As shown in FIG. 5B, a playback control 5023 is further set in the video editing interface S502. The playback control 5023 is clicked, to play the animated video in the video editing interface S503. Further, a full-screen control 5031 may be further set in the video editing interface S503. If the user clicks on the full-screen control 5031, the animated video may be switched to full-screen playback in the video editing interface, as shown in the interface S504. The so-called full-screen playback means that image content of the animated video is displayed in full screen in the video editing interface. In this manner, a maximum preview effect may be achieved, and it is convenient for the creator to check creation details of all animated videos.

Figure 5C:
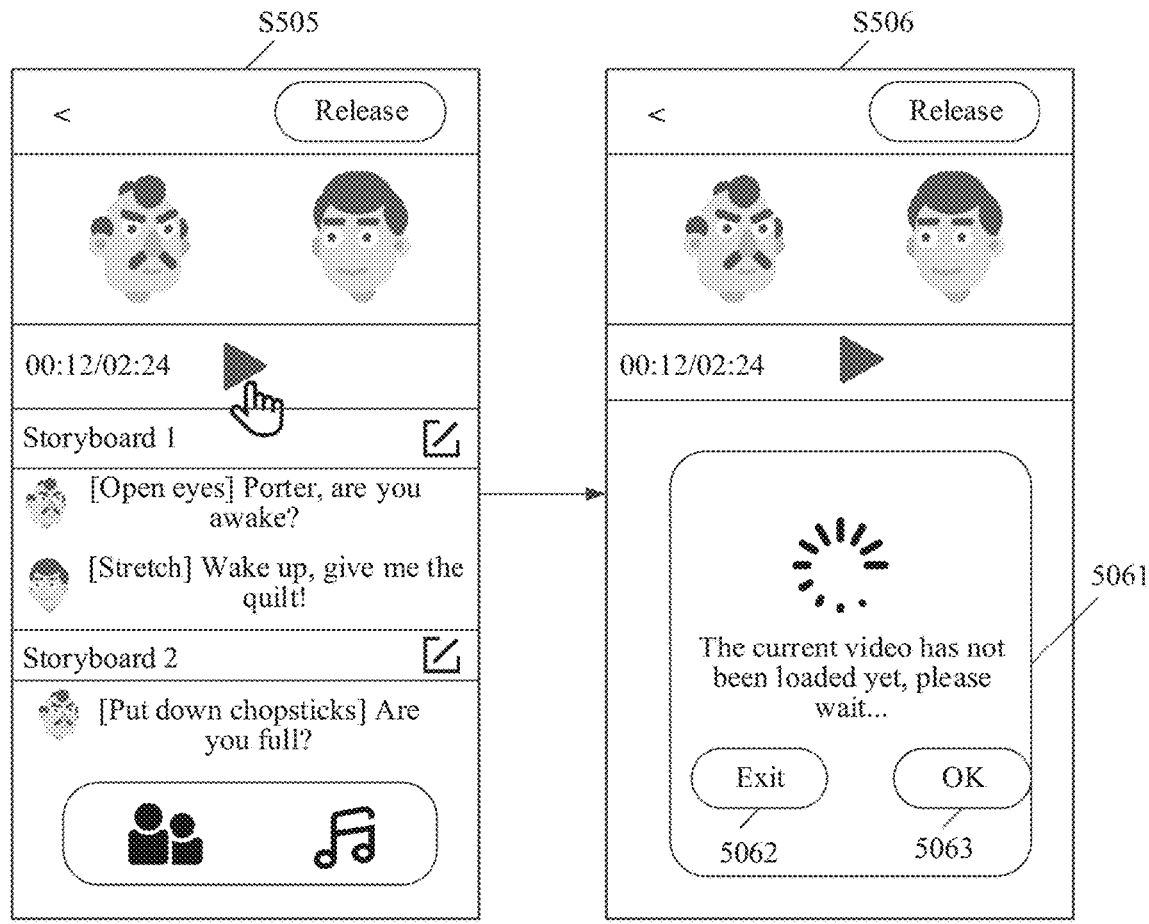
FIG. 5C is a schematic diagram of another interface of playing an animated video according to an embodiment of this application.

In a possible implementation, after clicking to play the animated video, if the animated video has not been loaded yet, a prompt window may be output. FIG. 5C is a schematic diagram of another interface of playing an animated video according to an embodiment of this application. As shown in FIG. 5C, when the user clicks on the playback control in the video editing interface S505, if the animated video has not been loaded yet, a prompt window 5051 may be output. A prompt text may be displayed in the prompt window 5061. For example, the prompt text may be: "The current video has not been loaded yet, please wait . . . " An exit control 5062 and an OK control 5063 are further set in the prompt window 5061. If the user clicks on the exit control 5062, the animated video may be given up. If the user clicks on the OK control 5063, the animated video may be previewed only after the animated video is loaded.

In a possible implementation, posture data is further set for the target character. The animated video is played, the line audio is played when the image including the target character is played, and the target character is controlled to present the posture. The playing the line audio when the image including the target character is played, and controlling the target character to present the posture includes any one of the following: in a process of displaying the image including the target character, first playing the line audio, and after playing the line audio, controlling the target character to present the posture; or in a process of displaying the image including the target character, controlling the target character to first present the posture, and then playing the line audio; or at any moment in a process of playing the line audio, controlling the target character to present the posture.

For example, as shown in FIG. 5B, in a process of displaying the image including the target character, the target character is controlled to first present a face posture of "open eyes", and then the line audio "Porter, are you awake?" is played; or in a process of displaying the image including the target character, the target character is controlled to first present a body action of "putting down chopsticks", and then a line audio "Are you full?" is played, and the like. In this manner, richer image content may be presented, thereby improving fun and expressiveness of the animated video.

In a possible implementation, posture data is further set for the target character. if a quantity of texts is greater than 1, and one text corresponds to one line audio, a quantity of line audios of the target character in the animated video is greater than 1. If an amount of posture data is greater than 1, a quantity of postures that the target character needs to present in the animated video is greater than 1. The computer device is further configured to perform the following operations: setting a first output order between each text, and sequentially playing, according to the first output order, a line audio corresponding to each text in the animated video; setting a second output order between each piece of posture data, and controlling, according to the second output order, the target character to sequentially present a posture corresponding to each piece of posture data in the animated video; and setting an associated output order between any text and at least one piece of posture data, and in a process of controlling playing of the line audio corresponding to any text in the animated video, controlling, according to the associated output order, the target character to present at least one corresponding posture, where the first output order, the second output order, and the associated output order each support dynamic adjustment.

The first output order between each text may be: an order of output from left to right; the second output sequence between each piece of posture data may be: for adjacent face postures and body actions, sequentially outputting posture data corresponding to the face postures and posture data corresponding to the body actions; and an associated output order may be: outputting a text first, then outputting the posture data, and the like.

Figure 5D:
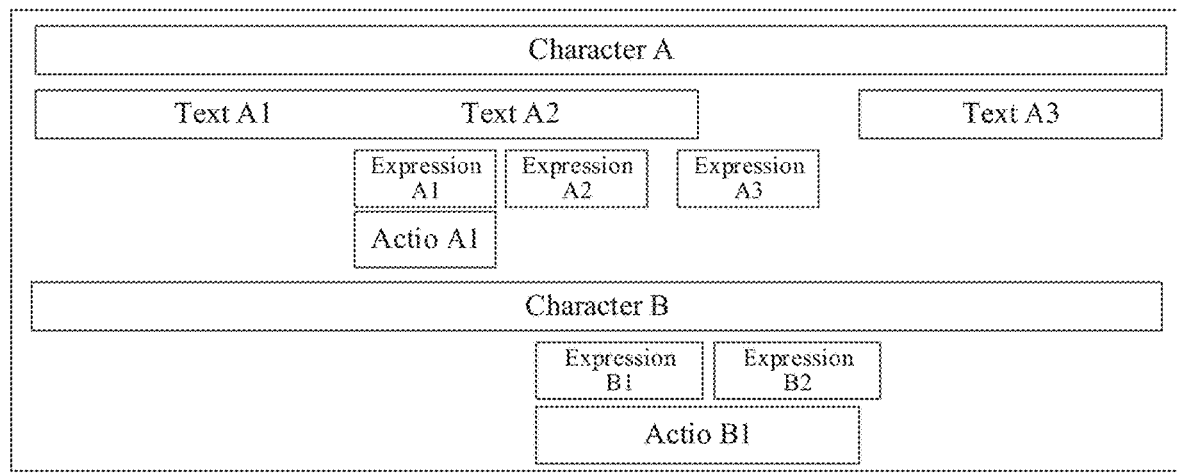
FIG. 5D is a schematic diagram of a script interface of setting an output order according to an embodiment of this application.

For example, FIG. 5D is a schematic diagram of a script interface of setting an output order according to an embodiment of this application. As shown in FIG. 5D, the schematic diagram of the script interface shows texts and posture data set by the user for a character A and a character B. The texts and the posture data that are set may be separately expressed as the following script data of three sentences:

Script data of a first sentence: Character A: text A1 [expression A1] [action A1] [expression A2] text A2 [expression A3], where [expression A1] [action A1] [expression A2] belong to adjacent face postures and body actions, and therefore, [expression A1] [action A1] [expression A2] are sequentially output;

script data of a second sentence: Character B: [expression B1] [action B1] [expression B2], where [expression B1] [action B1] [expression B2] belong to adjacent face postures and body actions, and therefore, [expression B1] [action B1] [expression B2] are sequentially output; and script data of a third sentence: Character A: text A3.

Then, according to the first output order, the second output order, and the associated output order set above, in a process of playing the animated video, the corresponding image content may be presented according to the script data mentioned above. First, the script data of the first sentence is executed: The character A reads a line audio corresponding to [text A1], and then reads a line audio corresponding to [text A2]. When the character A reads the line audio corresponding to [text A2], a face posture corresponding to [expression A1], a body action corresponding to [action A1], and a face posture corresponding to [expression A2] start to be serially expressed; and because there is no text immediately following [expression A3], the character A expresses a face posture corresponding to [expression A3] after reading the line audio corresponding to [text A2]. Then, the script data of the second sentence is executed: the character B serially expresses a face posture corresponding to [expression B1], a body action corresponding to [action B1], and a face posture corresponding to [expression B2]. Finally, the script data of the third sentence is executed: the character A reads a line audio corresponding to [Text A3].

It may be understood that the first output order, the second output order, and the associated output order each support dynamic adjustment. Specifically, the associated output order between any text and at least one piece of posture data may be adjusted to: outputting the posture data first, and then outputting the text. If postures corresponding to the posture data include a face posture and a body action, the body action may be output when the face posture is output; or the face posture is first output, and then the body action is output; or the body action is first output, and then the face posture is output.

In this manner, in a video editing process, after determining the target character and setting the corresponding text and posture data for the target character, the user may control the target character to present the corresponding posture according to the set first output order, second output order, and associated output order, and with the adjustment of the first output order, the second output order, and the associated output order, the generated animated video also displays different image content, which may improve fun of video editing and enhance the user experience.

Next, related processes such as storyboard sequencing and storyboard editing are described in detail.

In a possible implementation, storyboards support being sequenced. The animated video includes a first storyboard and a second storyboard, and a playback order of the first storyboard precedes a playback order of the second storyboard. A storyboard sequencing interface is displayed, where the storyboard sequencing interface includes the first storyboard and the second storyboard, and the first storyboard and the second storyboard are arranged and displayed in the storyboard sequencing interface according to a playback order. An arrangement position of the first storyboard and/or an arrangement position of the second storyboard in the storyboard sequencing interface are changed; and the playback order of the first storyboard or the second storyboard is adjusted according to a changed arrangement position.

Figure 6A:
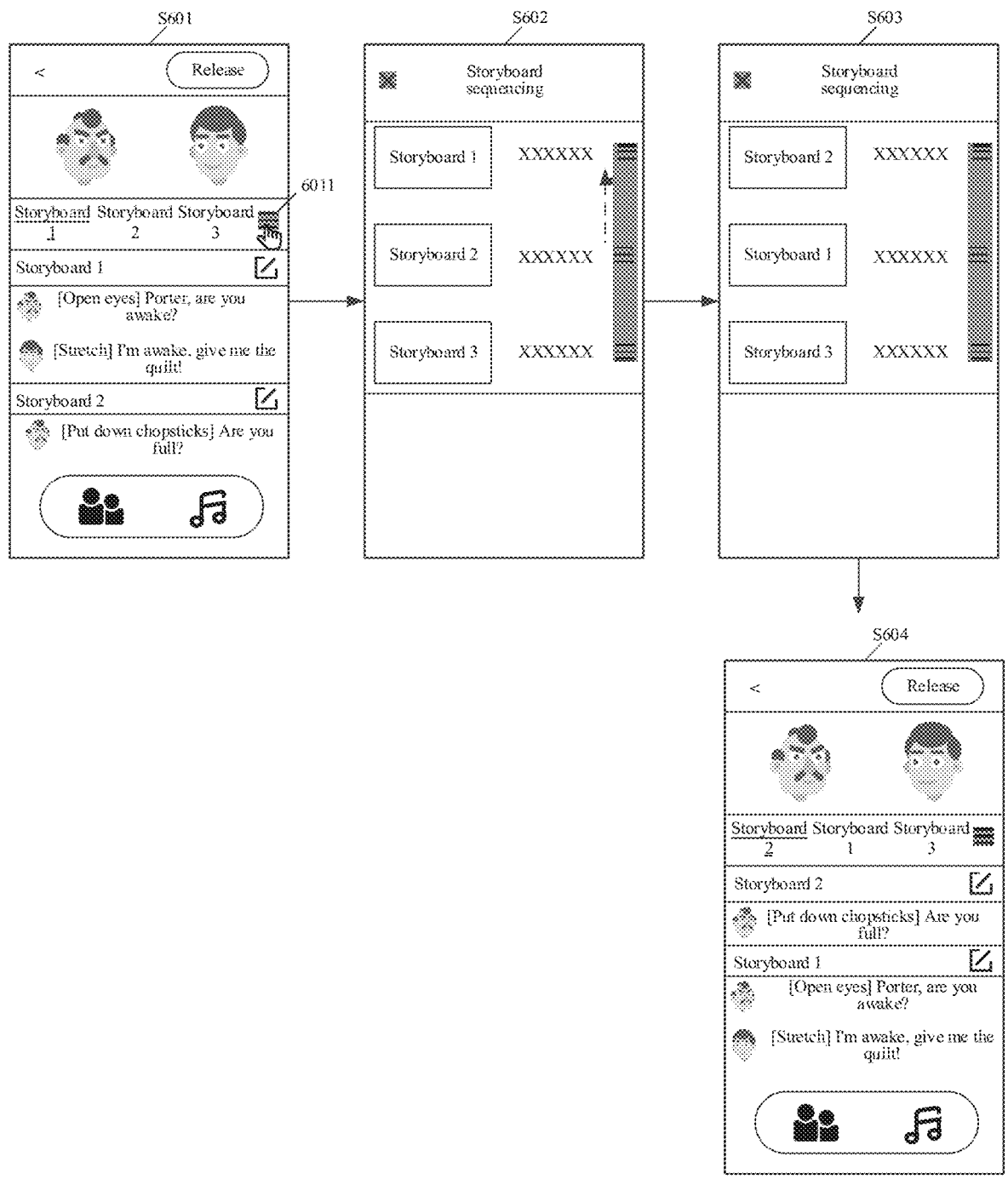
FIG. 6A is a schematic diagram of an interface of storyboard sequencing according to an embodiment of this application.

For example, FIG. 6A is a schematic diagram of an interface of storyboard sequencing according to an embodiment of this application. As shown in FIG. 6A, an animated video is displayed in the video editing interface S601. The animated video may include a storyboard 1, a storyboard 2, and a storyboard 3, and a playback order of the storyboard 1 precedes a playback order of the storyboard 2, and the playback order of the storyboard 2 precedes a playback order of the storyboard 3. A storyboard sequencing control 6011 is set in the video editing interface S601. When the storyboard sequencing control 6011 is selected (for example, operations such as single clicking, double clicking, or touching-and-holding), the storyboard sequencing interface S602 is displayed. The storyboard sequencing interface S602 displays a plurality of storyboards (a storyboard 1, a storyboard 2, and a storyboard 3) included in the animated video, and the storyboard 1, the storyboard 2, and the storyboard 3 are arranged and displayed in the storyboard sequencing interface S602 according to the playback order. The user may drag the storyboard in the storyboard sequencing interface S602 to change an arrangement position of the dragged storyboard. For example, the storyboard 1 may be dragged to a display position of the storyboard 2, and the storyboard 2 is automatically displayed at a display position of the storyboard 1. When the arrangement position of the storyboard 1 and the arrangement position of the storyboard 2 change, the storyboard sequencing interface S603 may be displayed.

Further, after the arrangement position of the storyboard 1 and the arrangement position of the storyboard 2 change, the playback order of the storyboard 1 and the storyboard 2 in the video editing interface is also accordingly adjusted. As shown in the video editing interface S604, the playback order of the storyboard 2 precedes the playback order of the storyboard 1. In this manner, in this application, a plurality of storyboards included in the animated video may be quickly and conveniently sequenced, thereby adjusting a playback order of each storyboard in the animated video.

In a possible implementation, storyboards support being edited. The animated video includes at least one storyboard, any storyboard supports being edited, and the editing includes any one or more of copying, deleting, and dynamically modifying. In response to a dynamically modifying operation on a target storyboard, a timeline editing panel corresponding to the target storyboard is displayed; and on the timeline editing panel corresponding to the target storyboard, dynamically modifying is performed on image content involved in the target storyboard, and the animated video is updated based on the dynamically modifying.

Specifically, the target storyboard includes a plurality of video frames, and the timeline editing panel displays image content of each video frame and script data corresponding to each character in each video frame. The script data includes any one or more of the following: a text corresponding to a line audio of each character, and posture data corresponding to each character.

Figure 6B:
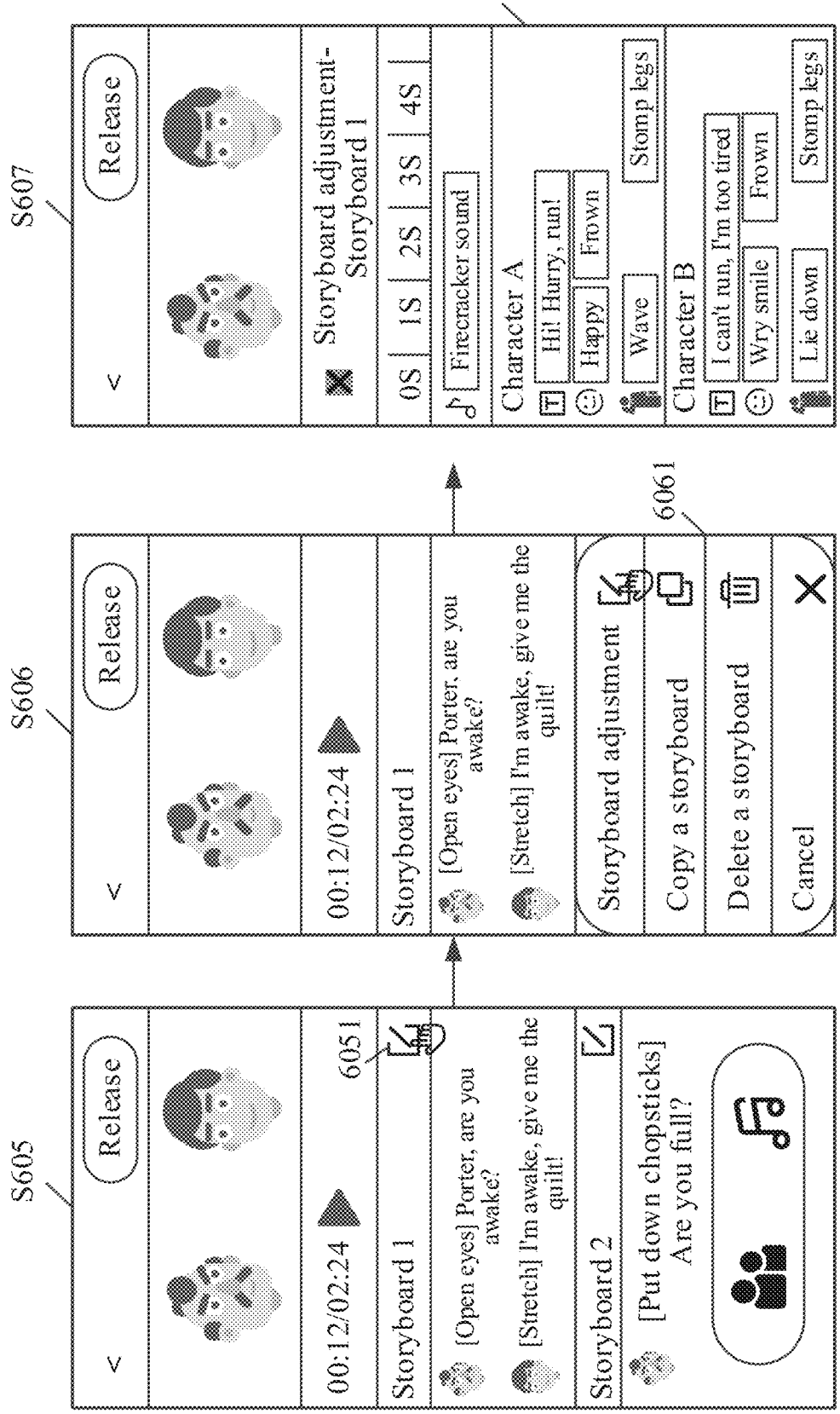
FIG. 6B is a schematic diagram of an interface of storyboard editing according to an embodiment of this application.

For example, FIG. 6B is a schematic diagram of an interface of storyboard editing according to an embodiment of this application. As shown in FIG. 6B, the video editing interface S605 displays a plurality of storyboards, such as a storyboard 1 and a storyboard 2, and any storyboard corresponds to one editing control. When an editing control 6051 for a target storyboard (for example, the storyboard 1) is selected, a storyboard editing menu bar 6061 corresponding to the storyboard 1 may be displayed. The storyboard editing menu bar 6061 displays a storyboard adjusting function item, a storyboard copying function item, and a storyboard deleting function item. The storyboard adjusting function item is configured to support the storyboard in being dynamically modified, the storyboard copying function item is configured to support the storyboard in being copied, and the storyboard deleting function item is configured to support the storyboard in being deleted. If the user clicks on the storyboard adjusting function item, a timeline editing panel 6071 corresponding to the target storyboard (the storyboard 1) may be displayed. The timeline editing panel 6071 displays image content corresponding to each video frame (for example, one video frame every 1s) included in the storyboard, and script data (such as the text and the posture data) respectively corresponding to the character A and the character B. A text corresponding to the character A may be: "Hi! hurry, run!", and posture data may include: "happy" and "frowning", as well as "waving" and "stomping legs"; and a text corresponding to the character B may be: "I can't crawl, I'm too tired.", and posture data may include: "wry smile" and "frowning", as well as "lying down" and "stomping legs."

Further, the dynamically modifying includes any one of the following: performing position adjustment on the script data corresponding to any character, performing time adjustment on the script data corresponding to any character, and performing alignment processing on script data between different characters.

Figure 6C:
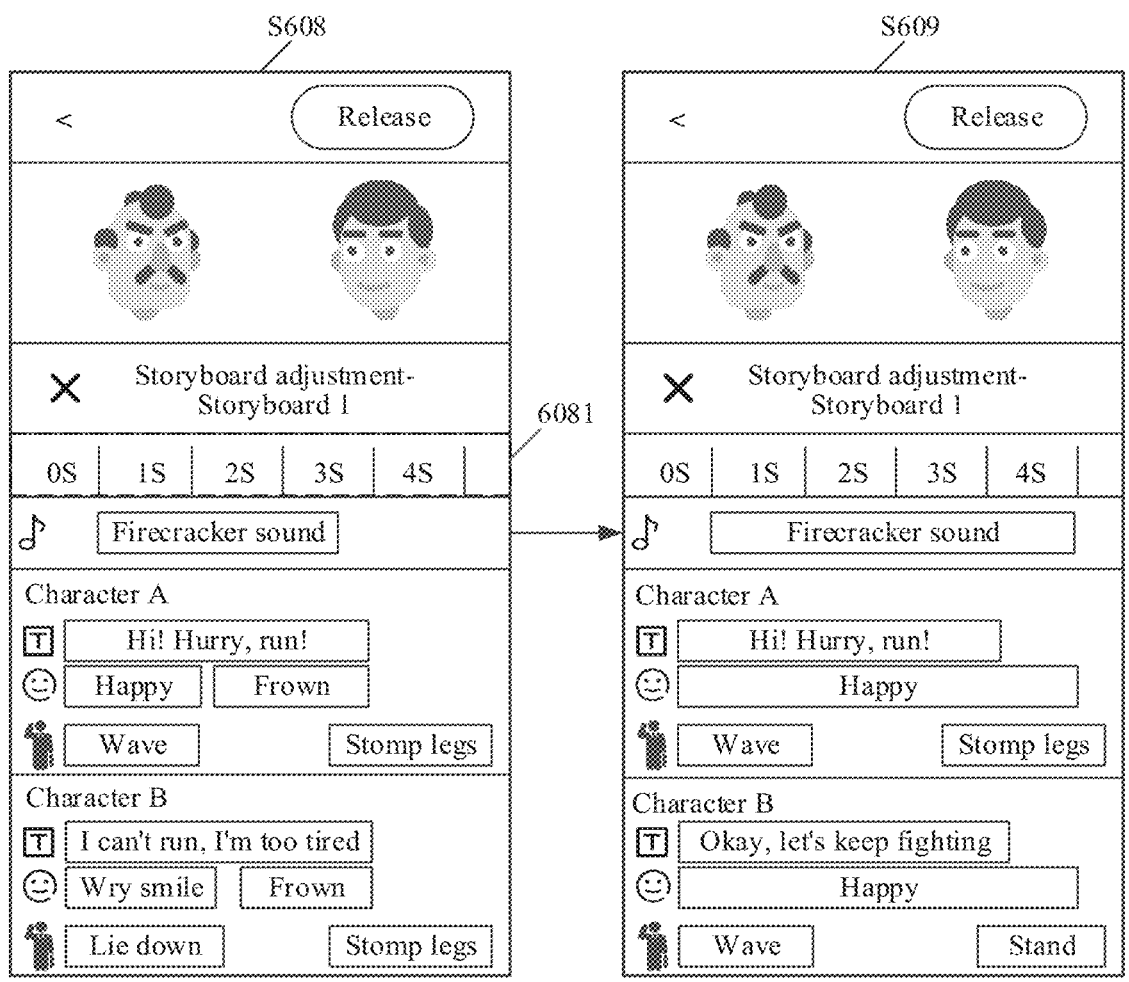
FIG. 6C is a schematic diagram of an interface of dynamically modifying according to an embodiment of this application.

For example, FIG. 6C is a schematic diagram of an interface of dynamically modifying according to an embodiment of this application. As shown in FIG. 6C, in the video editing interface S608, for example, the posture data "frowning" of the character A may be deleted, and a time bar (for example, a time period of 0s to 1s) corresponding to the posture data "happy" is extended to a timeline 6081 of the entire storyboard 1 until the end (for example, a time period of 0s to 4s), thereby ensuring that the character A keeps a happy face posture in the time period of 0s to 1s in the storyboard 1, and is modified to keep a happy face posture in the time period of 0s to 4s. For another example, a text "I can't run, I'm too tired" of the character B may be modified to "Okay, let's keep fighting", the posture data "frowning" is deleted, and the time bar (for example, the time period of 0s to 1s) corresponding to the posture data "happy" is extended to a timeline of the entire storyboard 1 until the end (for example, the time period of 0s to 4s), thereby ensuring that the character A and the character B always jointly present happy face postures in the image content of the storyboard 1. In this manner, face postures, body actions, and line audios corresponding to each character in the animated video may be finely adjusted through a storyboard-level timeline editing panel, thereby meeting a higher video creation requirement of the video creator.

Next, related processes such as character switching and character management are described in detail.

In a possible implementation, a character corresponding to the text supports being switched. Specifically, a character switching operation is received, where the character switching operation is configured for switching a target character corresponding to the text to a reference character; and in response to the character switching operation, the target character corresponding to the text is replaced with the reference character, where the reference character is selected in a character selection panel displayed after an identifier of the target character is triggered; or the reference character is selected in a shortcut selector, and the shortcut selector is configured to display a plurality of character identifiers that reach a preset selection frequency in a preset time period. It may be understood that if there are many character identifiers that reach the preset selection frequency in the preset time period, top N character identifiers with a highest selection frequency may be further determined from the plurality of character identifiers that reach the preset selection frequency, and the top N character identifiers with the highest selection frequency may be displayed in a shortcut selector, where N is a positive integer.

Figure 7A:
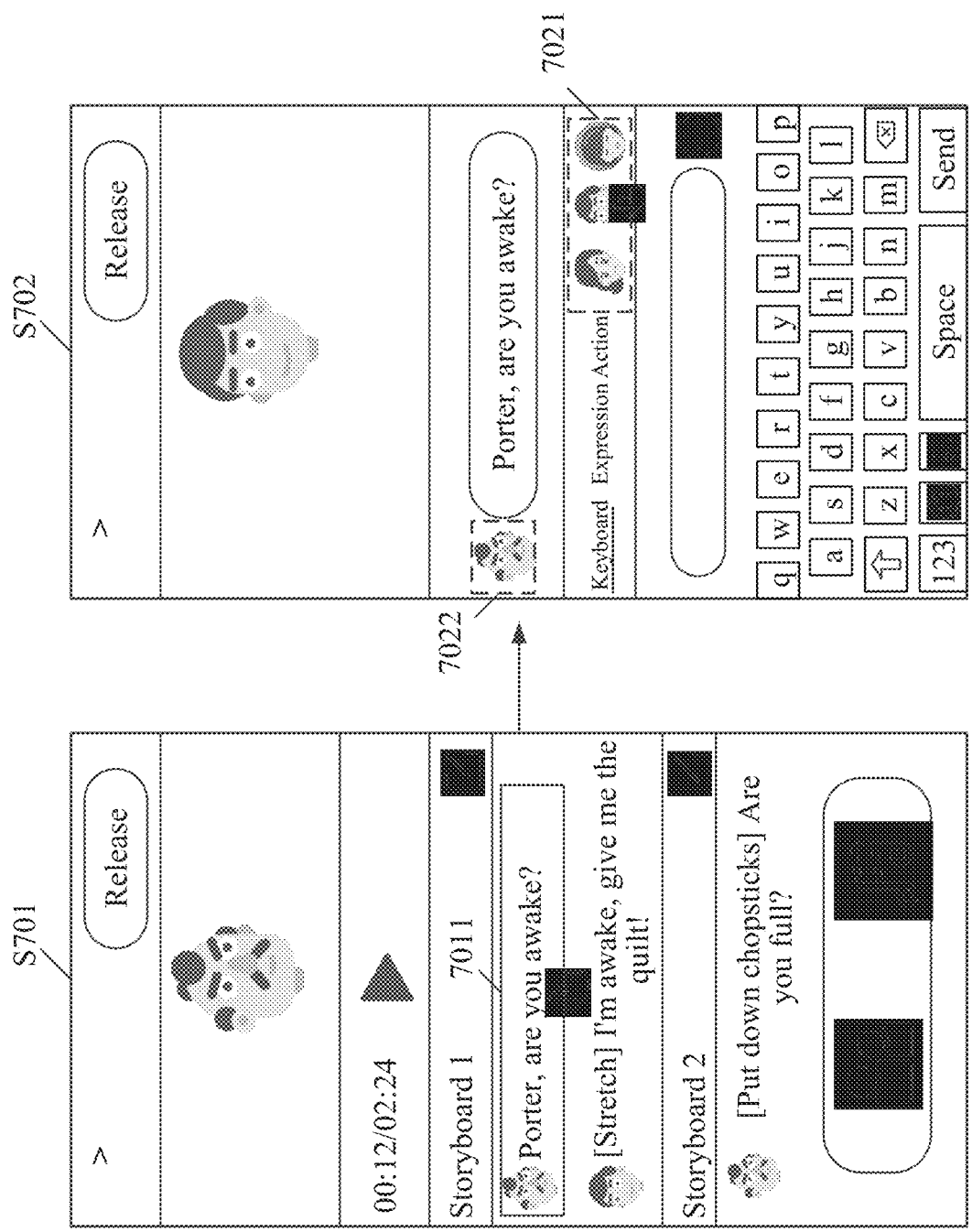
FIG. 7A is a schematic diagram of an interface of character switching according to an embodiment of this application.

For example, in a process of editing the text, the character corresponding to the current text may be quickly switched. FIG. 7A is a schematic diagram of an interface of character switching according to an embodiment of this application. As shown in FIG. 7A, a text corresponding to each character included in the animated video is displayed in the video editing interface S701, for example, a text 7011 "Porter, are you awake?" corresponding to a target character, and then when the text 7011 is clicked (for example, operations such as single clicking, double clicking, or touching-and-holding), a text editing box may be displayed. There are two shortcut entries set in the text editor, where a first shortcut entry may be an identifier 7022 of the target character. If the identifier 7022 of the target character is clicked, a character selection panel may be evoked, and then the target character may be replaced by selection a corresponding reference character in the character selection panel. Then, in the animated video, the text "Porter, are you awake?" is read by a reference character instead of the target character.

In addition, a second shortcut entry may be a character shortcut selector 7021, where the character shortcut selector 7021 displays a plurality of character identifiers that reach a preset selection frequency in a preset time period. For example, the character shortcut selector 7021 displays three character identifiers with the top three selection frequencies in the past week. Then the user may directly select a second character in the character shortcut selector 7021 to replace a first character. In this manner, the character corresponding to the text may be quickly switched in a process of editing the text.

In a possible implementation, characters in the animated video support being managed. Specifically, a character management control is set in the video editing interface. A character management interface is output when the character management control is selected, where all characters included in the animated video and a management item for each character are displayed in the character management interface; and each character in the animated video is managed according to the management item, where a management item includes a character replacement item, and the management includes character replacement; or the management item includes a timbre changing item, and the management includes changing a timbre of a line audio of a character.

Figure 7B:
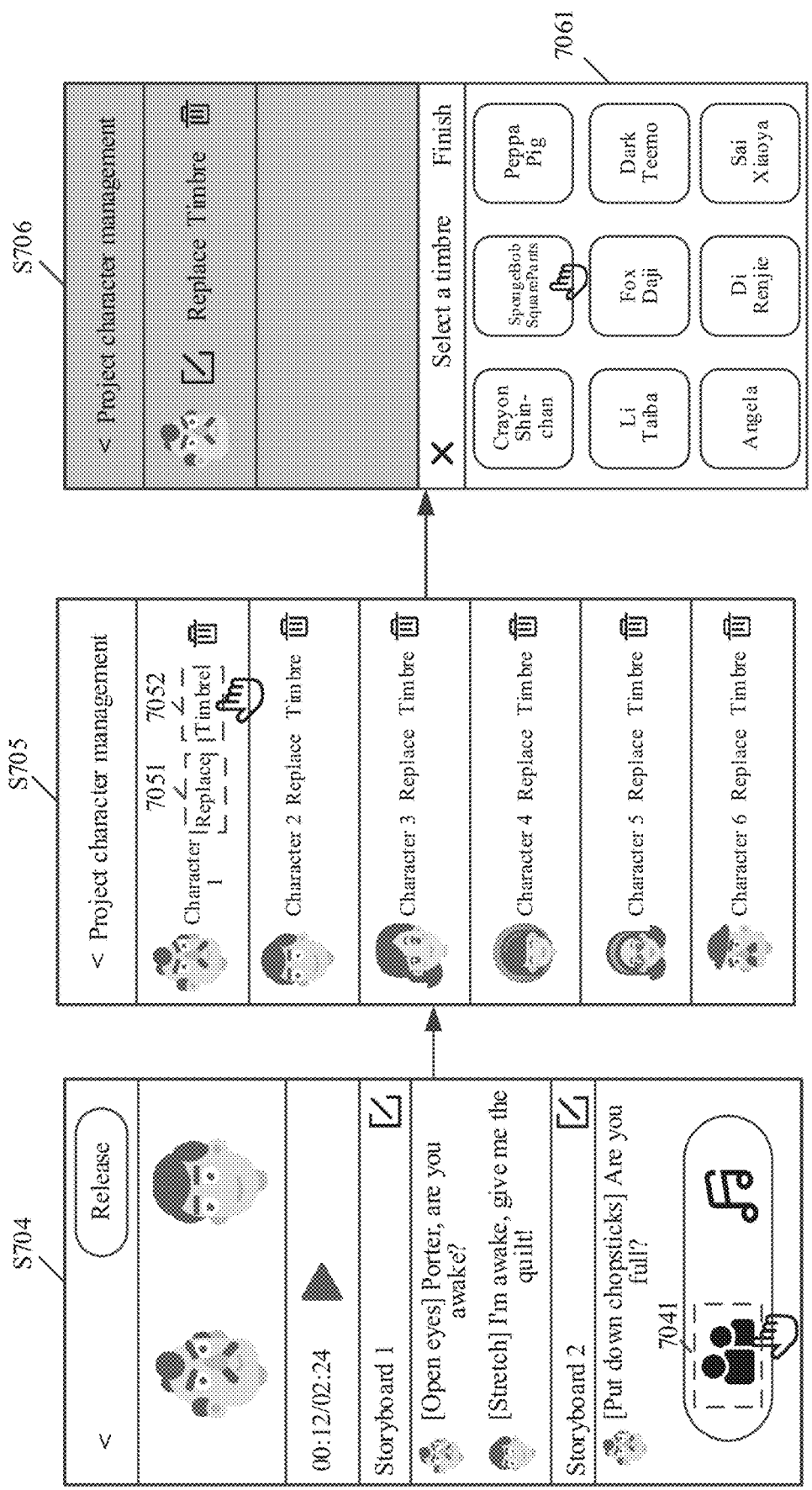
FIG. 7B is a schematic diagram of an interface of character management according to an embodiment of this application.

For example, FIG. 7B is a schematic diagram of an interface of character management according to an embodiment of this application. As shown in FIG. 7B, a character management control 7041 is set in the video editing interface S704. In response to the character management control 7041 being triggered, the character management interface S705 is displayed. The character management interface S705 displays a plurality of characters, such as a character 1, a character 2, a character 3, a character 4, a character 5, and a character 6, where each character may correspond to one character replacement item and one timbre changing item. For example, the character 1 may correspond to one character replacement item 7051 and one timbre changing item 7052. For example, if the user clicks on the character replacement item 7051, the character selection panel may be output, and then one character 2 may be selected in the character selection panel. In this way, the character 1 in the animated video is replaced with the character 2. Then, all subsequent image content showing the character 1 in the animated video is replaced with image content showing the character 2.

For another example, if the user clicks on the timbre changing item 7052, the timbre selection panel 7061 may be output. One or more timbre identifiers are displayed in the timbre selection panel 7061, for example, "Crayon Shinchan", "SpongeBob SquarePants", "Peppa Pig", "Li Taibai", "Fox Daji", "Angela", and the like. A specified timbre may be selected for the character 1 through the timbre selection panel 7061, so that when the animated video is played, the target character reads the corresponding line audio according to the specified timbre. In this manner, based on the timbre changing item, a timbre of the target character may be changed from one type of timbre (such as a timbre of a little boy) to another type of timbre (a timbre of a funny and witty uncle) when reading the line audio, thereby enriching the fun of the animated video and improving the user experience.

Finally, a process of exporting and sharing the edited animated video is described in detail.

In a possible implementation, the generated animated video supports being exported. a video export operation is performed on the animated video, where the video export operation includes any one or more of the following: saving to the terminal device, releasing to a creator homepage of the animated video, and sharing to a social session.

Figure 8A:
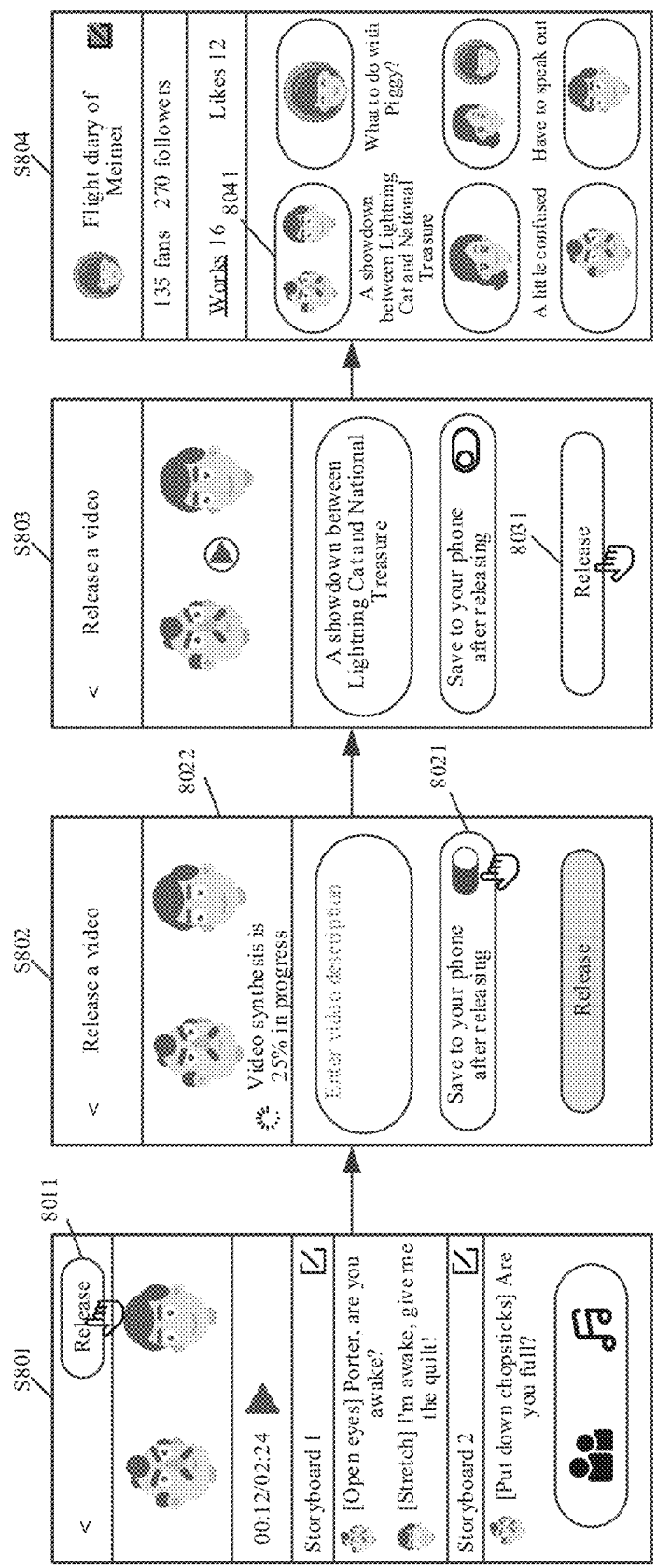
FIG. 8A is a schematic diagram of an interface of exporting an animated video according to an embodiment of this application.

FIG. 8A is a schematic diagram of an interface of exporting an animated video according to an embodiment of this application. As shown in FIG. 8A, an export control 8011 is set in the video editing interface S801. When the user clicks on the export control 8011, the animated video may be played in a preview area 8022 in the video editing interface S802, and a loading state of the animated video may be displayed. For example, a text "Video synthesis is 25% in progress" is displayed, which means that 25% of the animated video has been loaded, and the remaining 75% has not been loaded yet. In addition, a switch control 8021 may be further set in the video editing interface S802. If the switch control 8021 is clicked, the animated video may be synchronously saved to a terminal device after the animated video is exported.

Next, after clicking on the switch control 8021, the export control 8031 may be clicked again, formal export of the animated video may be completed, and the exported (released) animated video 8041 may be displayed on a homepage S804 of a creator. In addition, a quantity of works may be further updated in the homepage S804 of the creator, for example, the quantity of works is increased by 1 (for example, the quantity of works may change from 15 to 16), which means release of an animated video is completed.

Figure 8B:
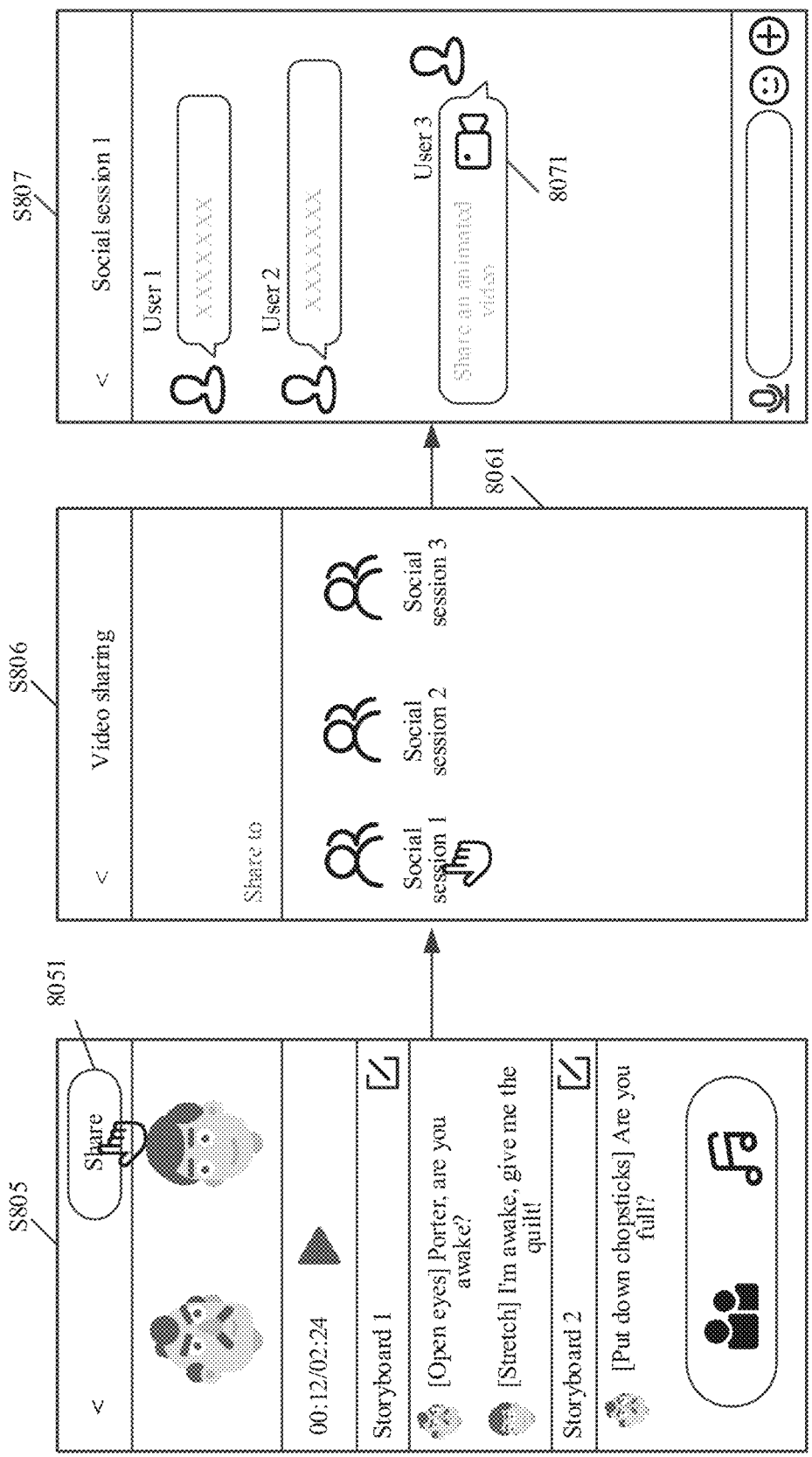
FIG. 8B is a schematic diagram of an interface of sharing an animated video according to an embodiment of this application.

In a possible implementation, the generated animated video supports being shared. FIG. 8B is a schematic diagram of an interface of sharing an animated video according to an embodiment of this application. As shown in FIG. 8B, a sharing control 8051 is further set in the video editing interface S805. If the sharing control 8051 is clicked, the video sharing interface S806 may be output. The video sharing interface S806 may display a plurality of social sessions, such as a social session 1, a social session 2, and a social session 3.

The so-called social session may include a separate session and a group chat session. The separate session refers to a social session in which two social users participate, and is configured for information exchange between the two social users. The group chat session refers to a social session in which a plurality of (more than two) social users participate, and is configured for information exchange among the plurality of social users. For example, the user may select at least one social session for video sharing in the video sharing interface S806. For example, if the social session 1 (the social session 1 may be a group chat session) is selected, the social session interface S807 of the social session 1 may be displayed, and a video link of the animated video may be displayed in the social session interface S807. For example, if the animated video is shared by a user 3, the video link may be displayed in a dialog box 8071 in the social session interface S807. The video link may include but is not limited to: a URL, an icon, and the like, and any social user in the social session 1 may trigger the video link, to play the animated video in the social session interface S807.

Next, the related background art involved in this application is described in detail. The specific art involved on a terminal device side and a server side in the video editing system is separately described with reference to the accompanying drawings.

1. Related Art Involved on the Terminal Device Side:

In embodiments of this application, for the terminal device side, the core is the design of a core data layer. The core data layer stores core data configured for driving generation of the animated video. The core data may include but is not limited to: a text entered for a target character, posture data set for the target character, and the like.

In addition, this application may be based on a manner of one-way driving of data of the core data layer, to ensure synchronous and real-time update of each UI interface. For example, the UI interface may include but is not limited to: a UI interface corresponding to preview area, a UI interface corresponding to a script display area, a storyboard sequencing interface, and a timeline editing panel.

Next, using the UI interface corresponding to the preview area and the UI interface corresponding to the script display area as an example, embodiments of this application are based on a manner of one-way driving of data, to ensure that the UI interface of the preview area and the UI interface of the script display area are synchronously updated in real time.

(1) Synchronous Update of the UI Interface of the Preview Area and the UI Interface of the Script Display Area in the Video Editing Interface.

Figure 9A:
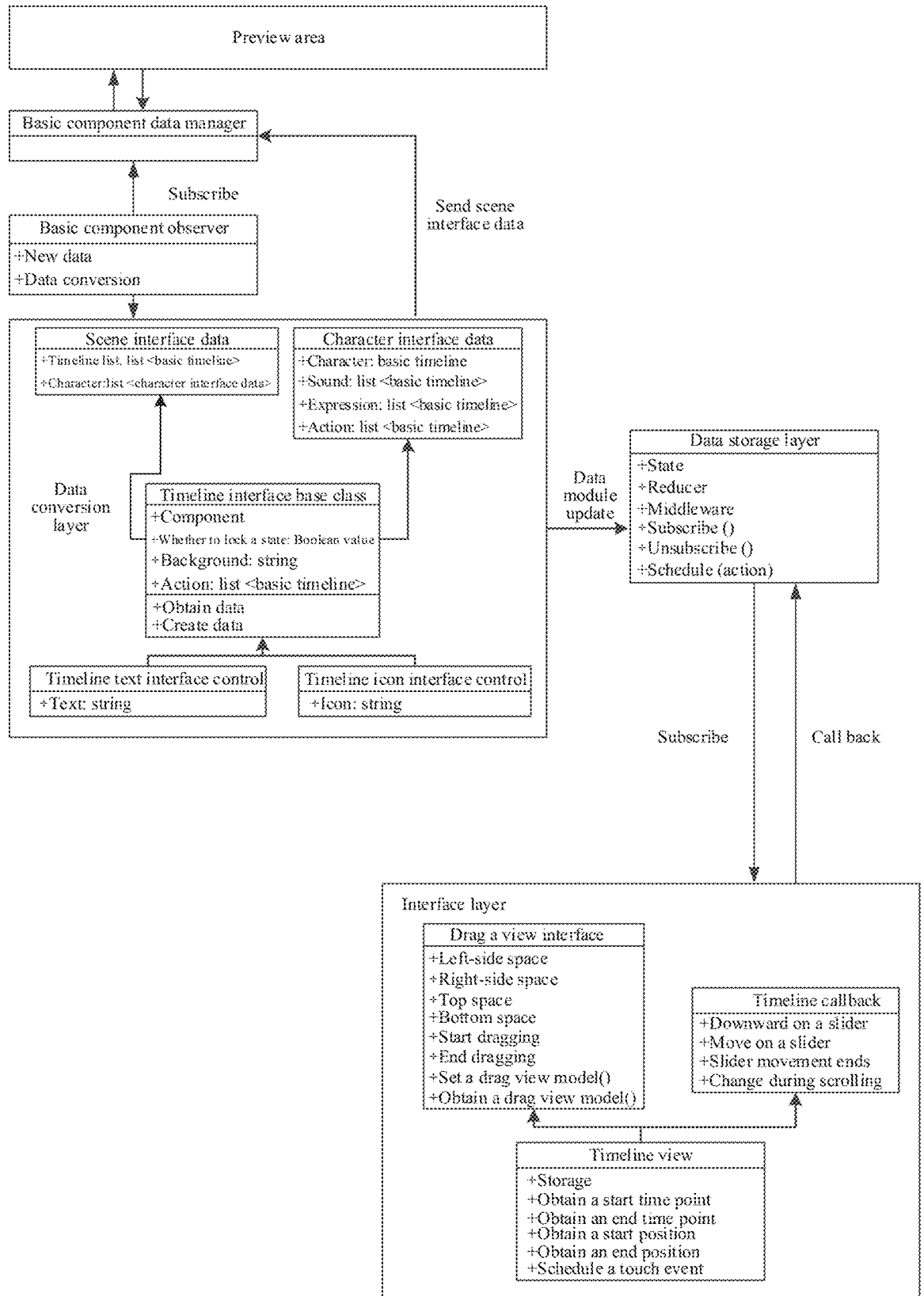
FIG. 9A is a schematic diagram of a structure of a terminal device according to an embodiment of this application.

FIG. 9A is a schematic diagram of a structure of a terminal device according to an embodiment of this application. As shown in FIG. 9A, synchronous update of the UI interface in the preview area and the UI interface in the script display area is driven by a manner in which a Data Store (data storage layer) manages the stored core data. Each UI interface has core data corresponding to the UI interface, and then by calculating the core data of each UI interface, a UI state value (interface state value) corresponding to each UI interface may be obtained. Finally, different UI interfaces may refresh and change the interface according to their corresponding UI state values.

Specifically, as shown in FIG. 9A, a structure of the terminal device may include but is not limited to the following modules: a preview area, a data conversion layer, a data storage layer, an interface layer, a basic component data manager, and a basic component observer. Next, each module is separately introduced.

Preview area: may be configured for previewing the animated video. Specifically, the preview area may be configured for previewing a target character included in the animated video. In a possible implementation, if posture data is further set in the target character, a face posture or a body action presented by the target character may be further previewed in the preview area.

Data conversion layer: may be configured for obtaining newly added data from a timeline text interface control (such as a keyboard) and a timeline icon interface control (such as a scene selection panel, a character selection panel, and the like), and may perform data conversion based on the obtained new data, thereby obtaining scene interface data and character interface data. The scene interface data may be generated after the user selects the scene image in the scene selection panel; and the character interface data may include: the target character (such as an identifier of the target character) selected by the user in the character selection panel, a timbre (such as a timbre of a funny and witty uncle) selected for the target character, and posture data (such as data corresponding to a face posture and/or a body action) set for the target character.

Data storage layer: configured for receiving data converted by the data conversion layer, such as the scene interface data and character interface data that are mentioned above.

Certainly, these data (scene interface data and character interface data) may be separately obtained from the corresponding UI interface. For example, the character interface data may be obtained from the UI interface corresponding to the preview area. Then a calculation processor may obtain the UI state value of the UI interface corresponding to the preview area by calculation based on the character interface data, to update the UI interface corresponding to the preview area.

Interface layer: configured for obtaining (subscribing) corresponding interface data (such as scene interface data and character interface data) from the data storage layer, and updating and displaying the timeline editing panel based on the obtained interface data; or when a corresponding operation (such as dragging the timeline) is detected in the video editing interface, a callback instruction is sent to the data storage layer, to notify the data storage layer to update the core data based on the corresponding operation.

Basic component observer: configured for observing or monitoring data addition and the data conversion process, and feeding back a monitoring result to the data conversion layer.

Basic component data manager: configured for receiving scene interface data, character interface data, and the like sent by the data conversion layer, so that the preview area displays the animated video based on these data (scene interface data and character interface data).

In the foregoing manner, the core data layer is designed on the terminal device side, and synchronous update of a plurality of UI interfaces is ensured based on one-way driving of data. For example, the user adds a body action for the target character in the script display area, and may synchronously control the target character to display the body action in the preview area; and for another example, if the user adds a face posture (such as a happy expression) to the target character in the script display area, the user may synchronously control the target character to show a happy expression in the preview area.

Figure 9B:
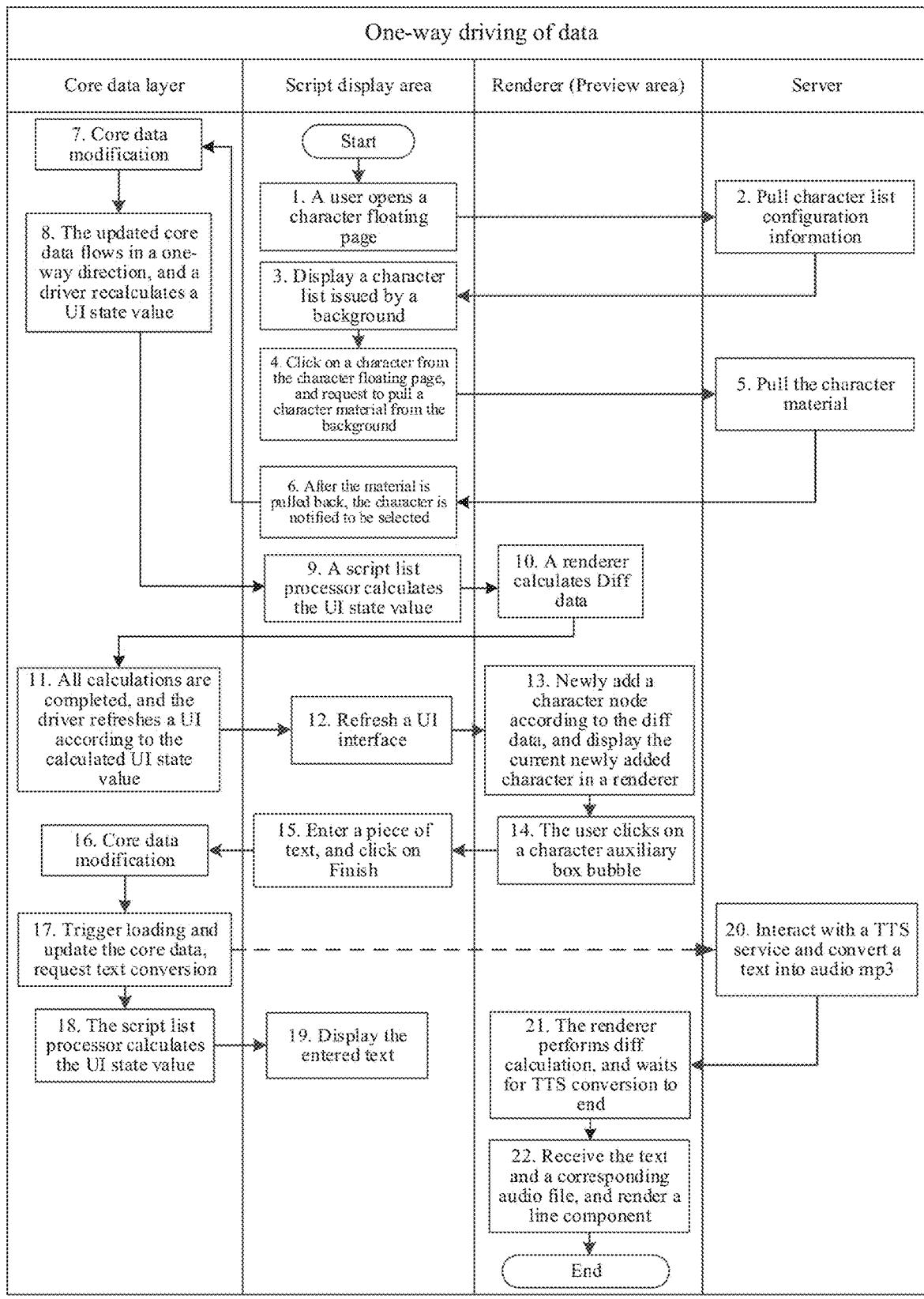
FIG. 9B is a schematic flowchart of one-way driving of data according to an embodiment of this application.

(2) Next, a detailed process of one-way driving of data is further described with Reference to the Two Processes of Determining Characters and Inputting Texts Mentioned in the Foregoing Embodiments of this Application:

FIG. 9B is a schematic flowchart of one-way driving of data according to an embodiment of this application. As shown in FIG. 9B, one-way driving of data mainly involves exchange between the core data layer (Data Store) in the terminal device, the script display area, a renderer (a processor of the preview area), and the server. The foregoing exchange process may include the following steps.

The related process of determining the character is as follows:

1. The user may open the character selection panel in the script display area of the terminal device, which is also referred to as a character floating page. In response to an operation of the user, a character information obtaining request is sent to a server. The character information obtaining request is configured for requesting to obtain character list configuration information (for example, may include information such as at least one character identifier, name, and the like).
2. The server (namely, background) pulls character list configuration information.
3. Display a character list issued by the server in the script display area. Specifically, the character list configuration information is displayed on the character selection panel, including at least one character identifier and a name corresponding to each character.
4. The user clicks on a target character identifier from the character selection panel, and sends an obtaining request for configuration information (namely, a character material) of the target character to the server. Specifically, the user clicks on a character from the character floating page, and requests to pull a character material from the background.

5. The server obtains (pulls), in response to the obtaining request for the configuration information of the target character, the configuration information of the target character, namely, a material of the character, and sends the configuration information to the terminal device.

6. The terminal device receives the configuration information of the target character, and notifies the target character that the target character has been determined in the script display area. Specifically, after the material is pulled back, the character is notified to be selected. In one embodiment, related files such as Spine animation of the target character may be downloaded according to the character list configuration information, and a selection box of the target character may be displayed in the character selection panel.

7. When the user clicks on the target character identifier in the character selection panel and successfully selects the target character, the script display area may send a data modification request to the core data layer. The core data layer updates, in response to the data modification request sent by the script display area, the core data stored in the core data layer, to obtain the updated core data.

8. The updated core data flows in a one-way direction, and a driver recalculates various interface state values (such as the UI state value of the preview area and the UI state value of the script display area). Specifically, all registered processors may be traversed to calculate the interface state value. The so-called one-way flow means that the core data layer may send the updated core data to the script display area and the preview area.

9. The script display area calculates a UI state value of the script display area by using a corresponding processor (such as a script list processor) based on the updated core data.

10. The preview area calculates Diff data (difference data) based on the updated core data by using a corresponding processor (such as a renderer). The difference data is obtained by calculation based on the core data before the update and the core data after the update.

11. After calculation of the UI state value corresponding to the script display area and the UI state value corresponding to the preview area is completed, each UI interface is driven to refresh the UI interface based on the calculated UI state value.

12. The script display area refreshes the UI interface based on the UI state value corresponding to the script display area.

13. The preview area refreshes the UI interface based on the UI state value corresponding to the preview area. In other words, the target character may be displayed in the preview area. Specifically, the renderer newly adds a character node according to the diff data, and displays the current newly added character in the renderer.

In addition, a related process of entering a text is as follows.

14. The user clicks on a character auxiliary box bubble. For example, refer to an attribute editing area 4011 in the interface S401 in FIG. 4. The user may click on a text editing item 4012 in the attribute editing area 4011.

15. Pull out a keyboard (as shown in the attribute editing area 4011 in FIG. 4), and perform text editing operation. For example, specifically, enter a piece of text (such as a line), and click on Finish.

16. When a text editing operation is detected in the script display area, a data modification request may be sent to a core data layer, to request the core data layer to update core data again.

17. The core data layer triggers loading and updates the core data, to obtain the core data updated once again. Then, the updated core data flows in a one-way direction, thereby driving recalculation of various interface state values (such as the UI state value of the preview area and the UI state value of the script display area).

In addition, in a process of loading and updating the core data, the core data is intercepted by a resource middleware, and a text conversion request is sent to the server asynchronously, so that the server performs step 20.

18. The script display area calculates a UI state value of the script display area by using a corresponding processor (such as a script list processor) based on the updated core data once again.

19. The script display area displays the entered text (for example, "Porter, are you awake?" shown in the interface S501 in FIG. 5A).

20. In response to the text conversion request, the server interacts with a TTS service, by using the TTS technology, converts the text input by the user into the line audio (such as an mp3 file), and sends the line audio mp3 file corresponding to the text and the text to the renderer.

21. The renderer calculates the Diff data (difference data) based on the core data updated once again, and waits for the server TTS conversion to end. After the server TTS conversion ends, the line audio mp3 file and the text sent by the server may be received.

22. The renderer renders a line component based on the received text and the corresponding line audio mp3 file, and displays a text-rendered interface in the preview area in the renderer. For example, as shown in the interface S502 in FIG. 5B, when the user subsequently triggers playback of the animated video, the target character may be presented to the user in an area 5021, and the target character may be controlled through a playback control 5023 to read the line audio corresponding to the text.

In this manner, each UI interface is based on the updated core data in the core data layer, and ensures synchronous update of each UI interface (for example, the UI interface corresponding to the script display area and the UI interface corresponding to the preview area) in a manner of one-way driving of data. In addition, the server uses non-blocking conversion in a process of performing the TTS text-to-speech operation. The so-called non-blocking conversion may not interrupt a process in which the user edits a video. For example, when the user enters a text, the corresponding line audio (mp3 file) is asynchronously pulled from the server, and the renderer is notified to load the corresponding line audio for the user to preview in real time in the preview area.

Figure 9C:
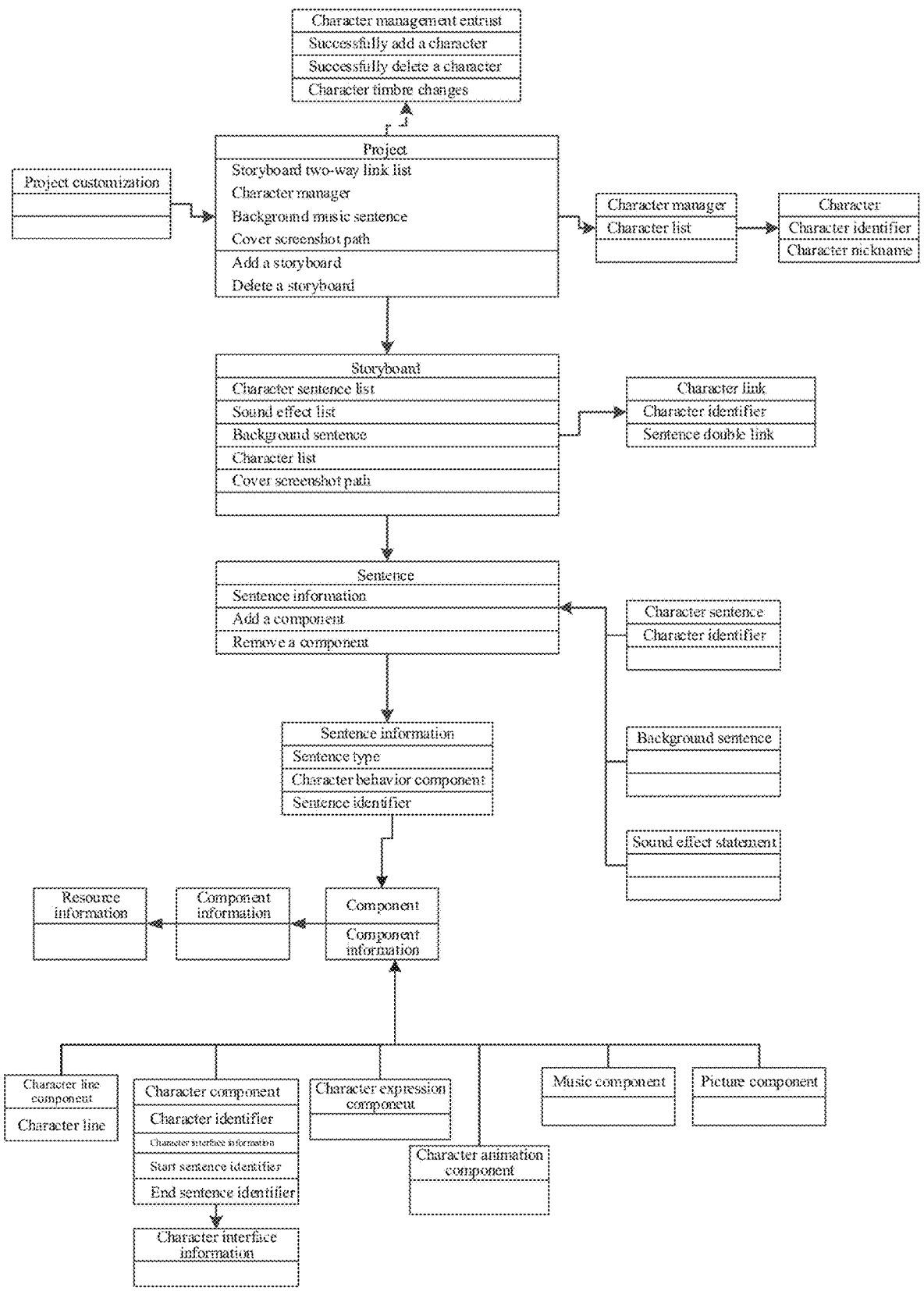
FIG. 9C is a schematic diagram of a structure of core data according to an embodiment of this application.

(3) A Specific Structure of Core Data:

It may be understood that this application is mainly driven to generate the animated video based on the core data mentioned above. Therefore, a specific structure of the core data is described in detail. FIG. 9C is a schematic diagram of a structure of core data according to an embodiment of this application. As shown in FIG. 9C, in an embodiment of this application, according to a product form, a structure of the core data may be divided into a plurality of levels: Project, StoryBoard, Statement (sentence/text), and Component.

Specifically, the project mentioned above may be for the animated video, including adding a storyboard, deleting a storyboard, and the like; and project data corresponding to the project may include a project state. The so-called project state may be configured for reflecting a state of the animated video. For example, the state of the animated video may be a playback state or a paused state, and the like.

In addition, for the storyboard level, a character may be added, a piece of text may be added, a piece of text may be deleted, and the like under the storyboard; and the storyboard data corresponding to the storyboard may include, but is not limited to: a character list (a plurality of character identifiers displayed in a character selection panel), a timbre list (a plurality of timbre identifiers displayed in a timbre selection panel), and the like. Next, for the sentence (in the subsequent embodiments of this application, the "sentence" may also be referred to "text") under the storyboard level, the sentence data corresponding to the sentence may include: a character sentence (a text set for the target character), a background sentence (may be a default text), a sound effect sentence, and the like. Finally, the component mentioned above may include, but is not limited to: a character line component (configured to control a line audio corresponding to the text read by the target character), a character component (configured to display the target character), a character expression component (configured to control the target character to present a face posture), a music component (configured to control the target character to make sounds according to the set timbre), and the like.

It may be understood that by splitting the core data into a plurality of levels, data corresponding to each level may be configured for accurately expressing operations performed by the user in different dimensions, for example, adding a character (which may be referred to as the target character) in the storyboard and adding a sentence; and for another example, posture data (posture data corresponding to a face posture and a body action) is set for the target character in the storyboard, and the like, so that a more perfect creation effect of the animated video may be adapted based on a more refined level.

(4) Double Link List Data Management Solution:

Combined with a schematic diagram of a structure of the core data shown in FIG. 9C, embodiments of this application mainly use a two-way link list data management solution, to adapt to a text editing operation (such as modifying a text, adding a text, or deleting a text) frequently performed by the user, a sequence adjusting operation (such as adjusting an order of at least one storyboard), and an insertion operation (such as adding a character under a storyboard, inserting a piece of text, or setting posture data for a character), and the like.

The so-called double link list is also referred to as a two-way link list. Each data node in the two-way link list data includes two pointers (a start pointer and an end pointer). The two pointers may also be referred to as a head pointer and a tail pointer. Next, the two-way link list data management solution provided in embodiments of this application is described in detail with reference to different cases respectively corresponding to FIG. 10A to FIG. 10G.

Case 1: Add a text A for a character 1 under a storyboard 1.

Figure 10A:
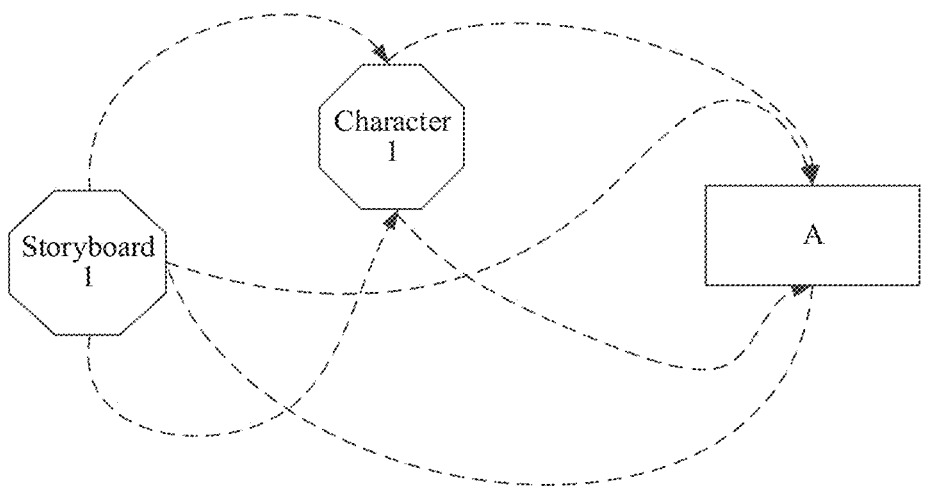
FIG. 10A is a schematic flowchart of an operation case according to an embodiment of this application.

FIG. 10A is a schematic flowchart of an operation case according to an embodiment of this application. As shown in FIG. 10A, the case mainly includes the following steps.

1. Update a text two-way link list of the storyboard 1, and add the text A;
2. Update a character two-way link list of the storyboard 1, and add a character 1 node; and
3. Update a two-way link list of a storyboard 1 character 1 node, and add the text A.

Case 2: Add a text B for a character 1 under a storyboard 1.

Figure 10B:
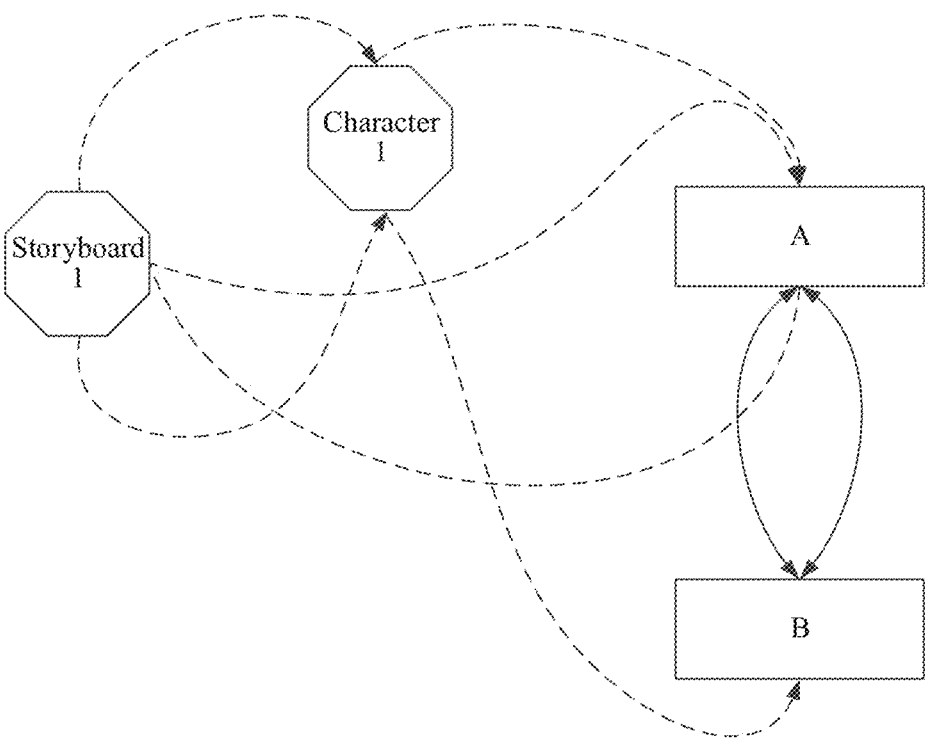
FIG. 10B is a schematic flowchart of another operation case according to an embodiment of this application.

FIG. 10B is a schematic flowchart of another operation case according to an embodiment of this application. As shown in FIG. 10B, the case mainly includes the following steps.

1. Update a text two-way link list of the storyboard 1, and add the text B; and
2. Update a two-way link list of a storyboard 1 character 1 node, and add the text B.

Case 3: Add a text C for a character 2 under the storyboard 1.

Figure 10C:
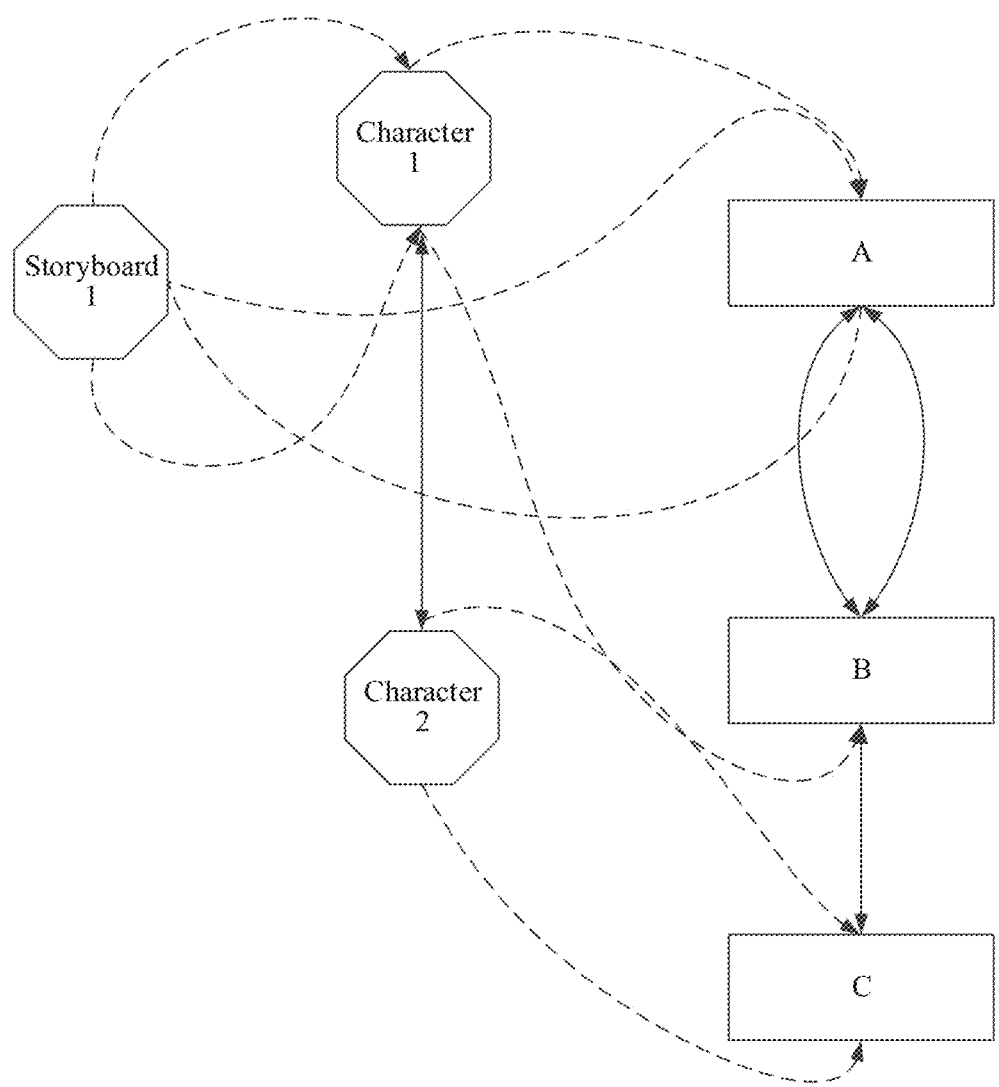
FIG. 10C is a schematic flowchart of another operation case according to an embodiment of this application.

FIG. 10C is a schematic flowchart of another operation case according to an embodiment of this application. As shown in FIG. 10C, the case mainly includes the following steps.

1. Update a text two-way link list of the storyboard 1, and add the text C;
2. Update a character two-way link list of the storyboard 1, and add a character 2 node; and
3. Update a text two-way link list of a storyboard 1 character 2 node, and add the text C.

Case 4: Add a storyboard 2, and add a text D for a character 1 under the storyboard 2.

Figure 10D:
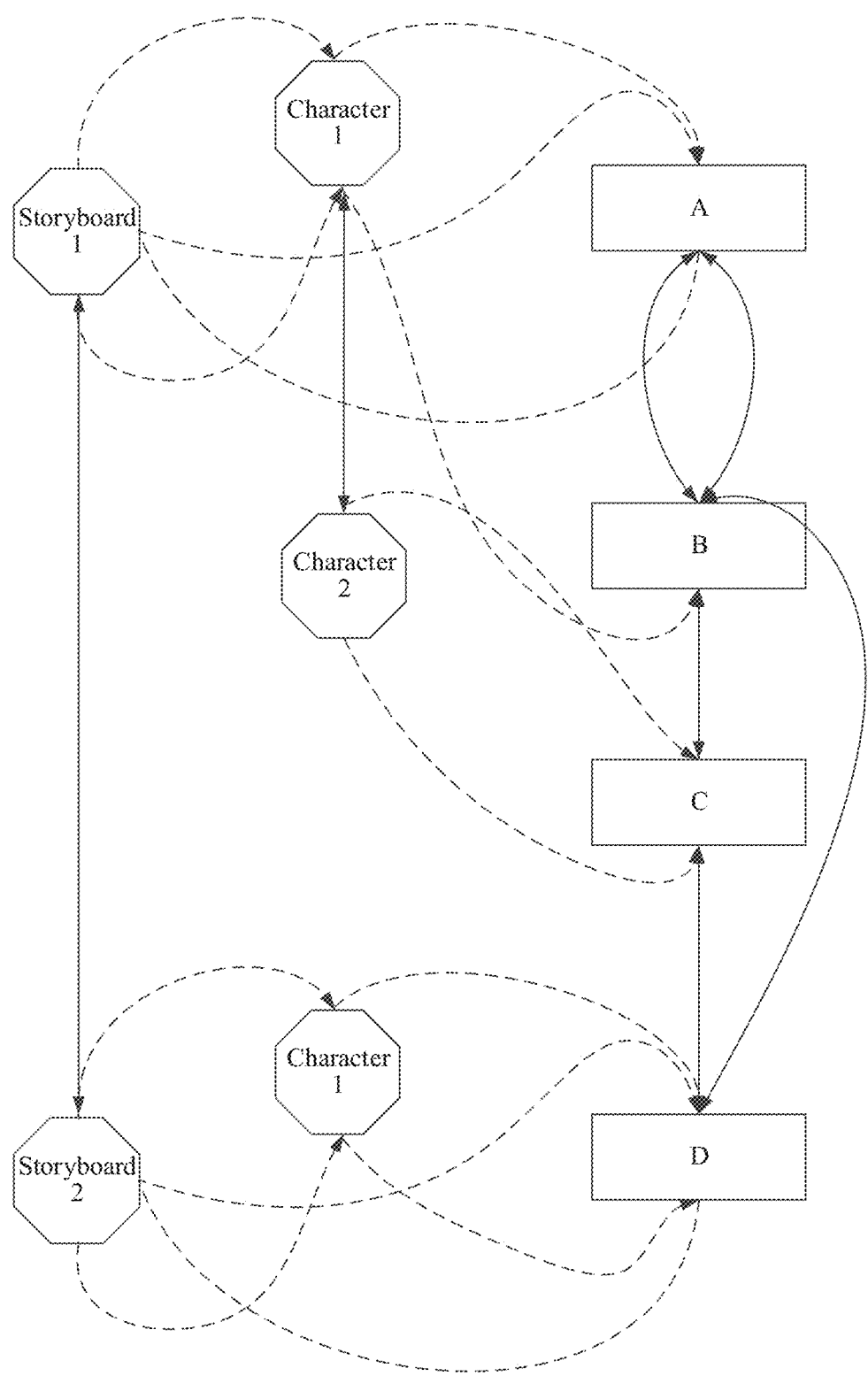
FIG. 10D is a schematic flowchart of another operation case according to an embodiment of this application.

FIG. 10D is a schematic flowchart of another operation case according to an embodiment of this application. As shown in FIG. 10D, the case mainly includes the following steps.

1. Update a storyboard two-way link list, and add a storyboard 2;
2. Update a text two-way link list of the storyboard 2, and add a text D;
3. Update a character two-way link list of the storyboard 2, and add a character 1 node; and
4. Update a text two-way link list of a storyboard 2 character 1 node, and add the text D;
5. Search for a text two-way link list under a storyboard 1, and link a text C and the text D; and
6. Search for the text two-way link list of a character 1 under the storyboard 1, and link a text B and the text D.

Case 5: Exchange positions of the text C and a text A under the storyboard 1.

Figure 10E:
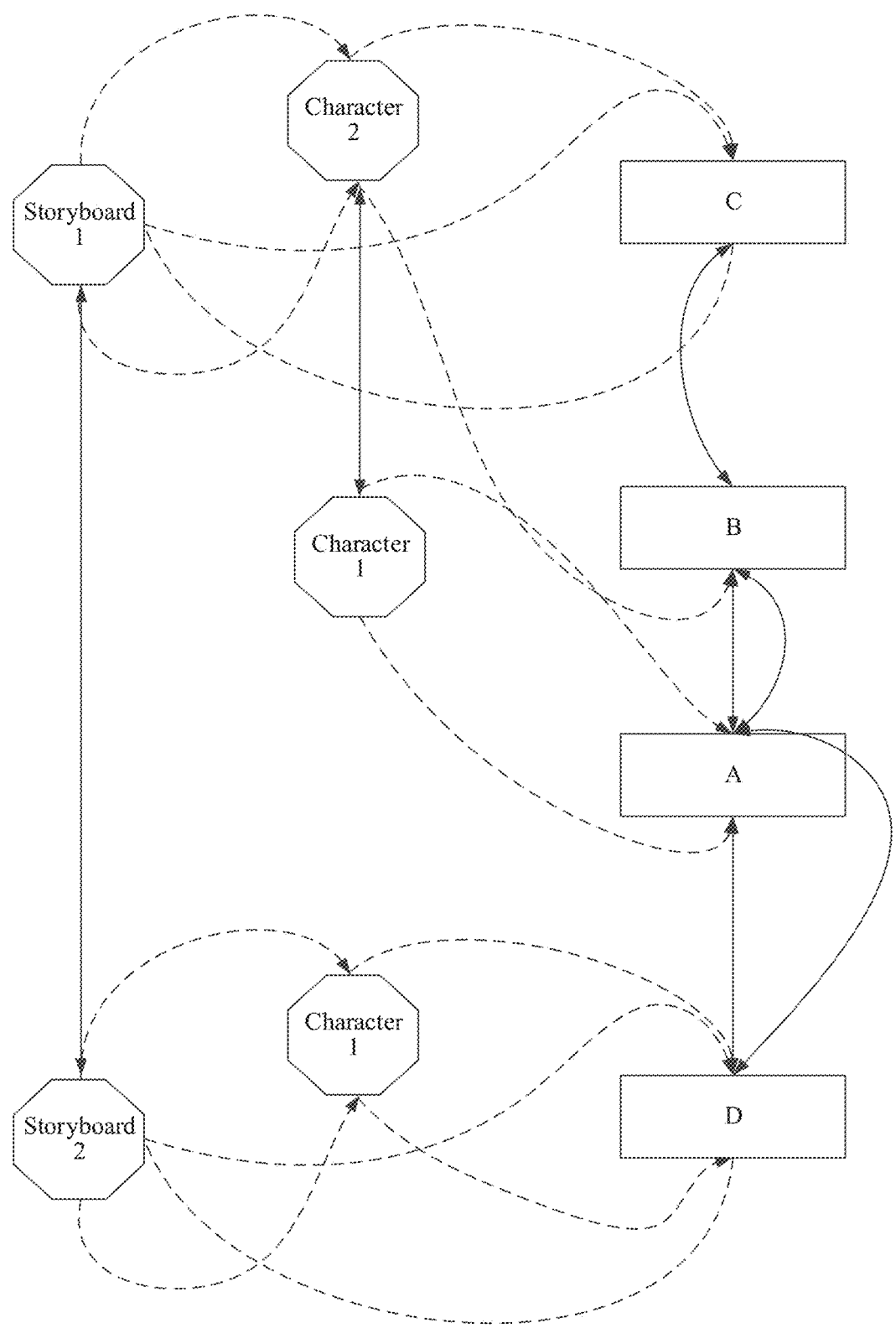
FIG. 10E is a schematic flowchart of another operation case according to an embodiment of this application.

FIG. 10E is a schematic flowchart of another operation case according to an embodiment of this application. As shown in FIG. 10E, the case mainly includes the following steps.

1. Update a text two-way link list under a storyboard 1, and exchange a text A and a text C;
2. Search for a text two-way link list under a storyboard 2, link the text A and a text D, and disconnect the text C;
3. Update a two-way link list of a character 1 under the storyboard 1, and exchange a text B and the text A; and
4. Update a character two-way link list under the storyboard 1, and exchange positions of a character 2 and the character 1.

Case 6: Add a storyboard 3, add the character 2 under the storyboard 3, and add a text E for the character 2.

Figure 10F:
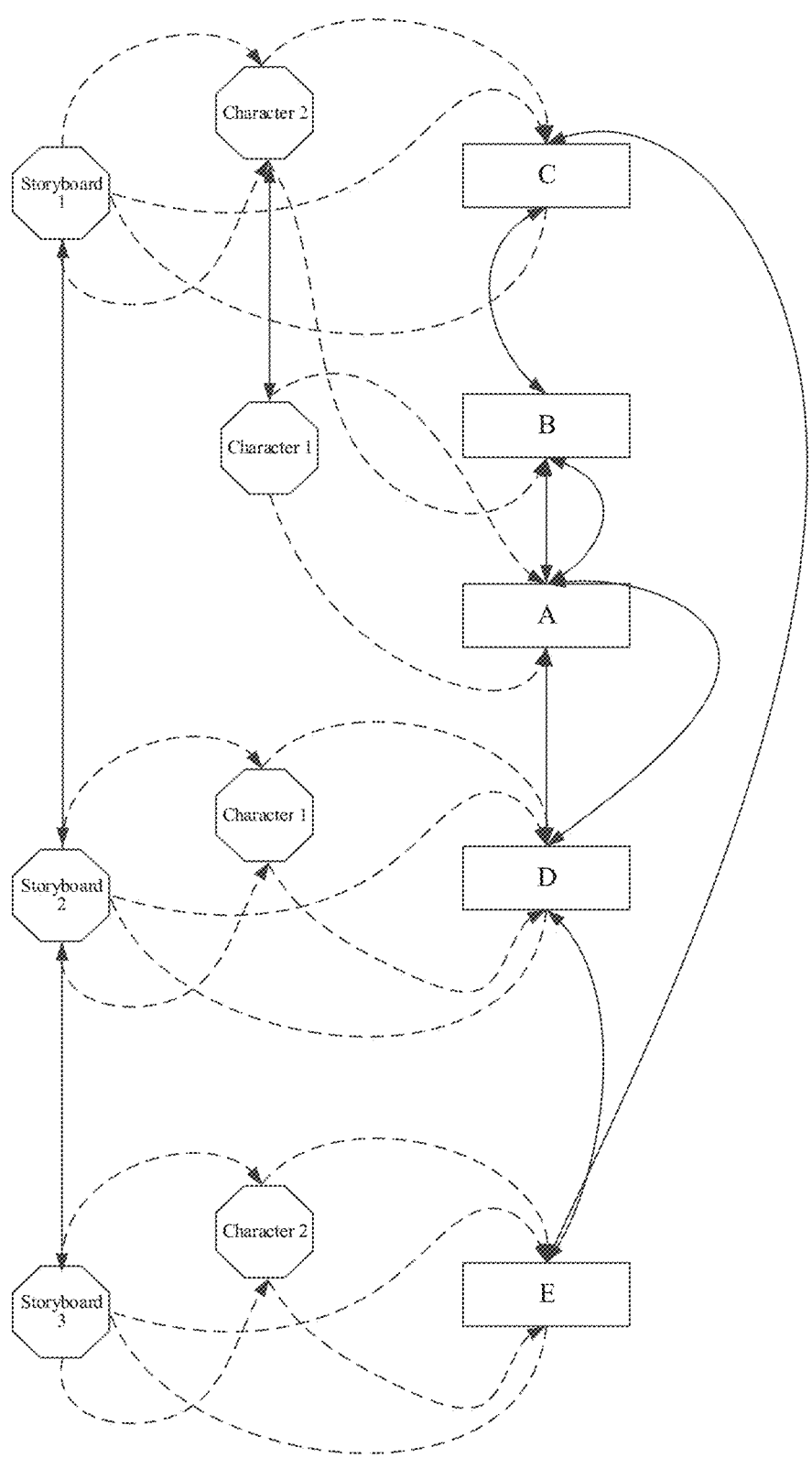
FIG. 10F is a schematic flowchart of another operation case according to an embodiment of this application.

FIG. 10F is a schematic flowchart of another operation case according to an embodiment of this application. As shown in FIG. 10F, the case mainly includes the following steps.

1. Update a storyboard two-way link list, and add a storyboard 3;
2. Update a text two-way link list of the storyboard 3, and add a text E;
3. Update a character two-way link list of the storyboard 3, and add a character 2 node; and
4. Update a text two-way link list of a character 2 node under the storyboard 3, and add the text E;
5. Search for a text two-way link list of a storyboard 2, and link a text D and the text E; and
6. Search for a text two-way link list of a character 2 of a storyboard 1, and link a text C and the text E.

Case 7: Adjust an order of the storyboard 1 and the storyboard 2.

Figure 10G:
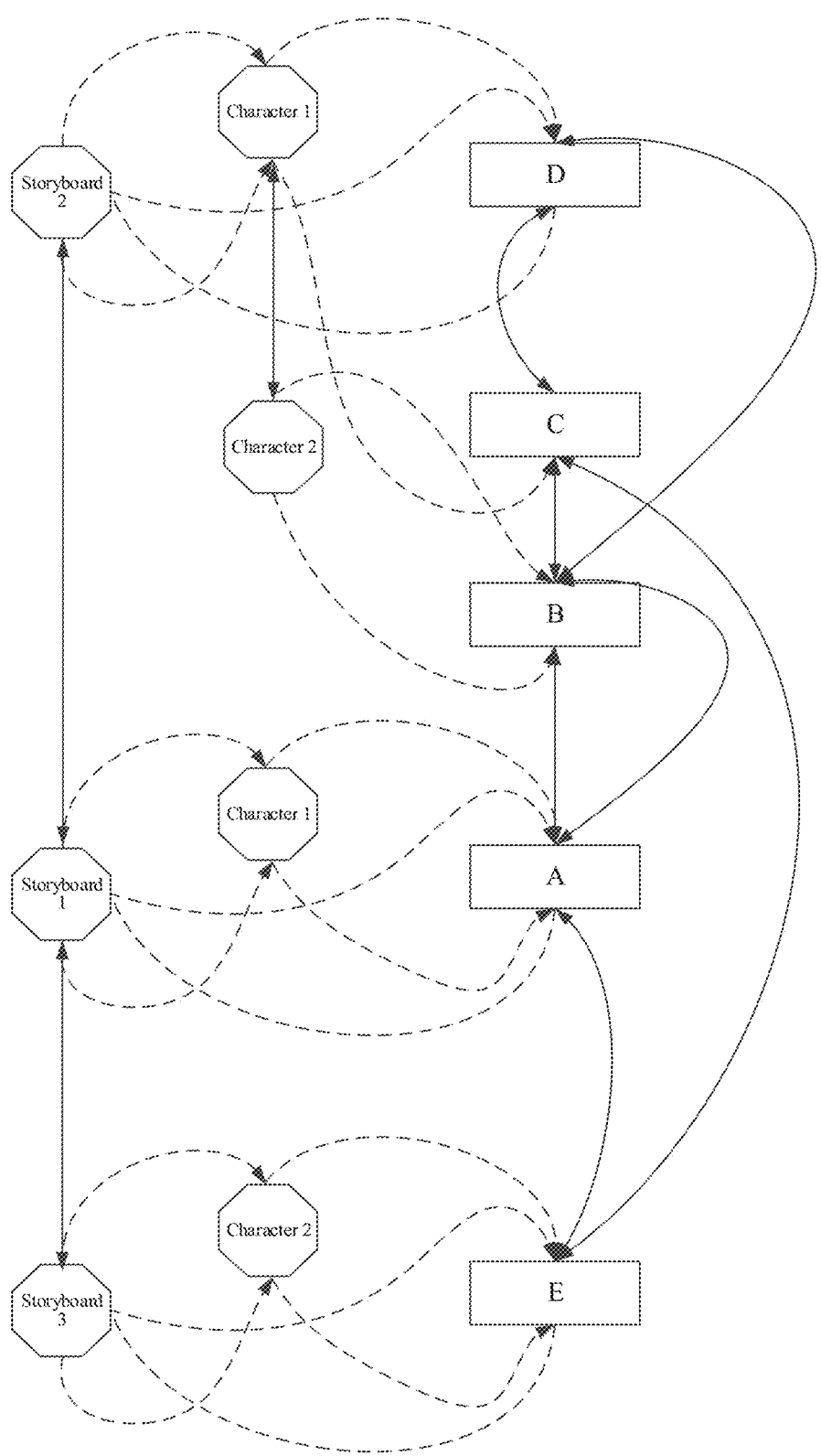
FIG. 10G is a schematic flowchart of another operation case according to an embodiment of this application.

FIG. 10G is a schematic flowchart of another operation case according to an embodiment of this application. As shown in FIG. 10G, the case mainly includes the following steps.
1. Update a storyboard two-way link list, and adjust the order of the storyboard 1 and the storyboard 2;
2. Update a text two-way link list of a storyboard 1, link a text A and a text E, and link a text C and a text D;
3. Update a text two-way link list of the storyboard 2, and link the text D and the text C; and
4. Search for a text two-way link list of a character 1 of the storyboard 1, and link the text D and a text B.

(5) Text Editing Operation Process:

Next, an editing operation involved in the text according to embodiments of this application is described in detail with reference to FIG. 11A to FIG. 11C.

① Insert the text A after the text B.

Figure 11A:
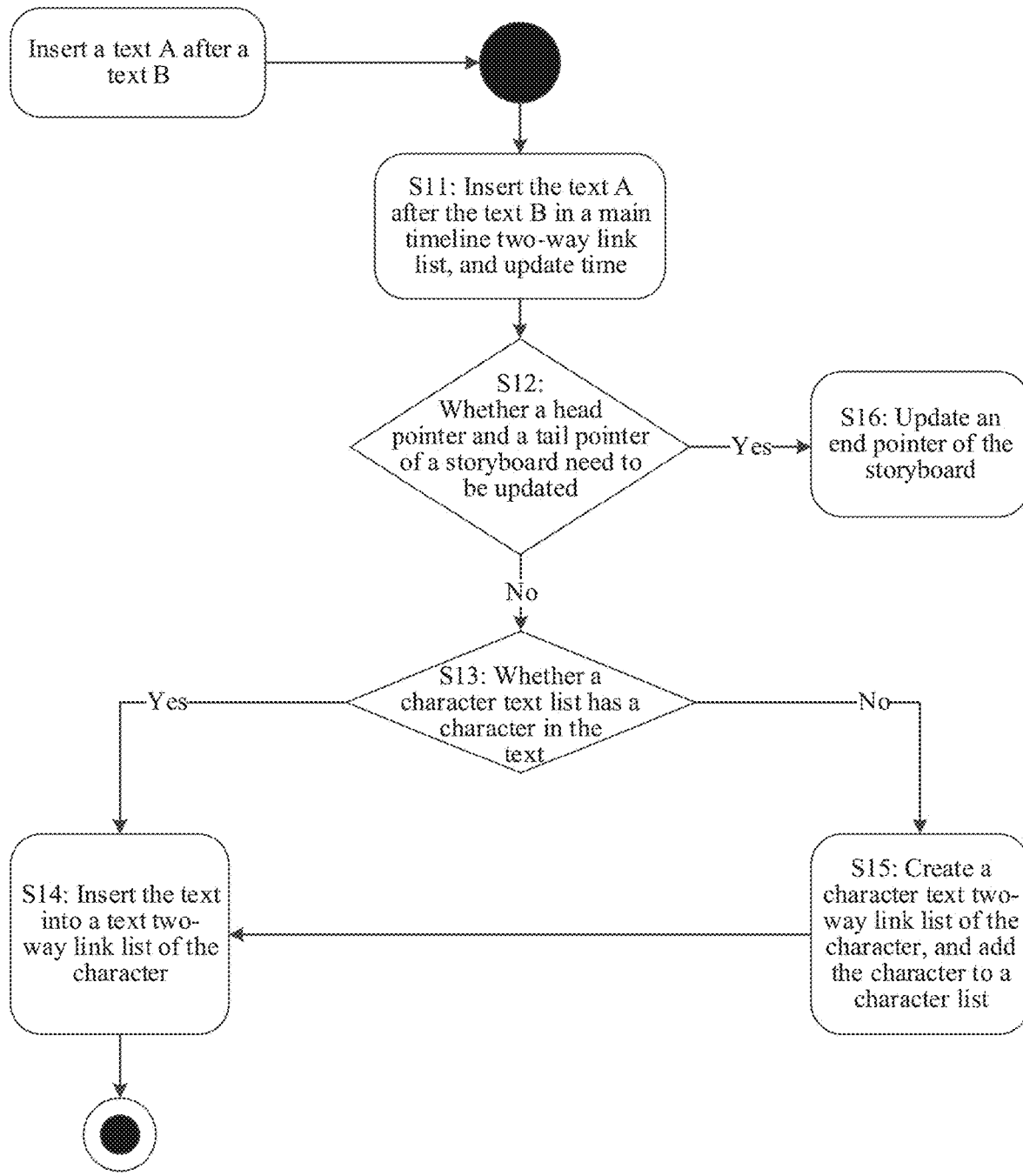
FIG. 11A is a schematic flowchart of a text editing operation according to an embodiment of this application.

FIG. 11A is a schematic flowchart of a text editing operation according to an embodiment of this application. The text editing operation may specifically include the following steps S11 to S16:

S11: Insert a text A after a text B in a main timeline two-way link list, and update time.

S12: Determine whether a head pointer and a tail pointer of a storyboard need to be updated. If no, perform S13; or if yes, perform S16.

S13: Determine whether a character text list includes a character in a text. If yes, perform S14; or if no, perform S15.

S14: Insert the text into the text two-way link list of the character.

S15: Create a character text two-way link list of the character, and add the character to a character list.

S16: Update an end pointer of the storyboard.

② Delete the text A.

Figure 11B:
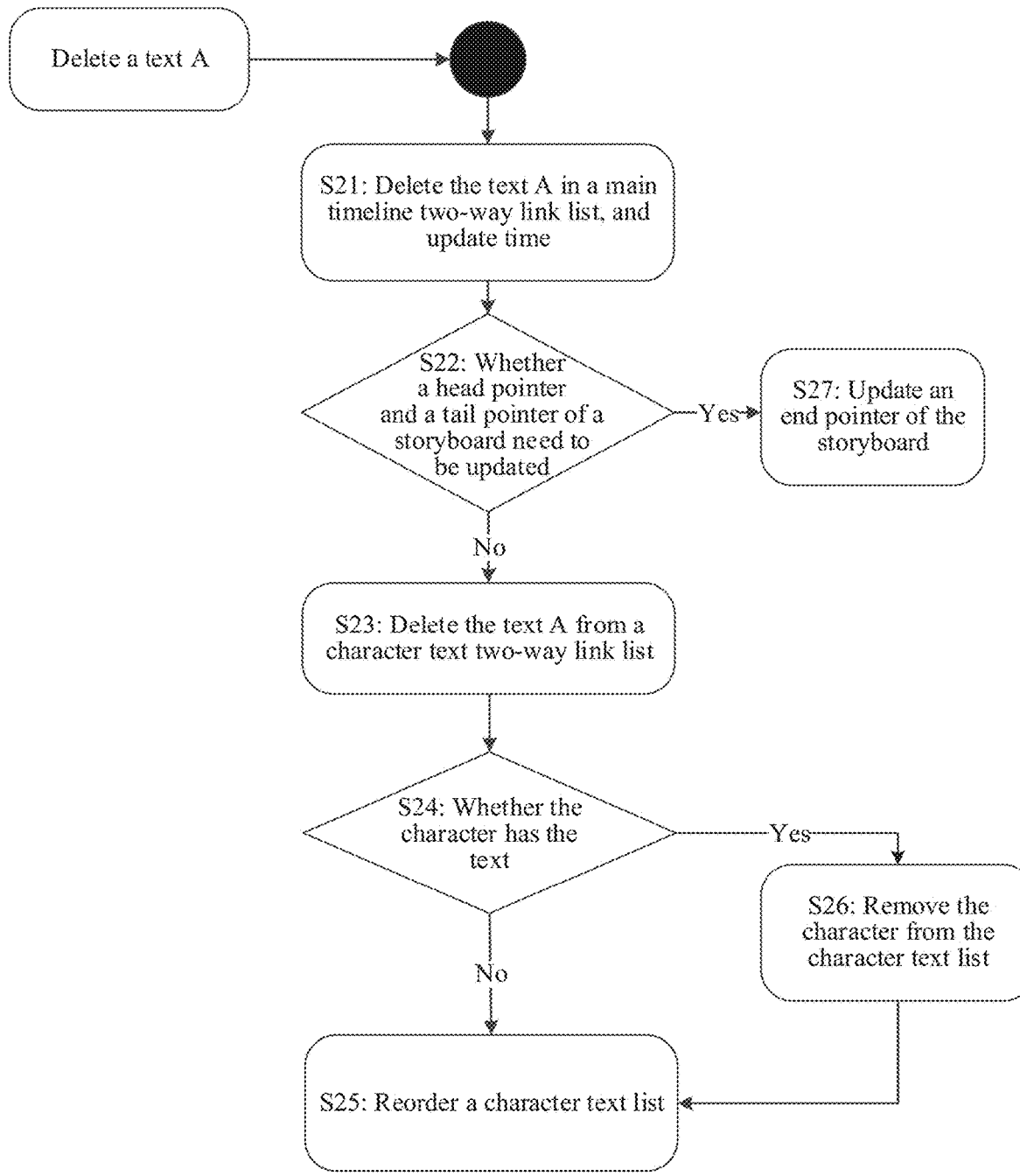
FIG. 11B is a schematic flowchart of another text editing operation according to an embodiment of this application.

FIG. 11B is a schematic flowchart of another text editing operation according to an embodiment of this application. The text editing operation may specifically include the following steps S21 to S27:

S21: Delete the text A in the main timeline two-way link list, and update the time.

S22: Determine whether a head pointer and a tail pointer of a storyboard need to be updated. If no, perform S23; or if yes, perform S27.

S23: Delete the text A from the character text two-way link list.

S24: Determine whether the character has a text. If yes, perform S26; or if no, perform S25.

S25: Reorder the character text list.

S26: Remove the character from the character text list.

S27: Update an end pointer of the storyboard.

③ Adjust an order of the text A and the text B.

Figure 11C:
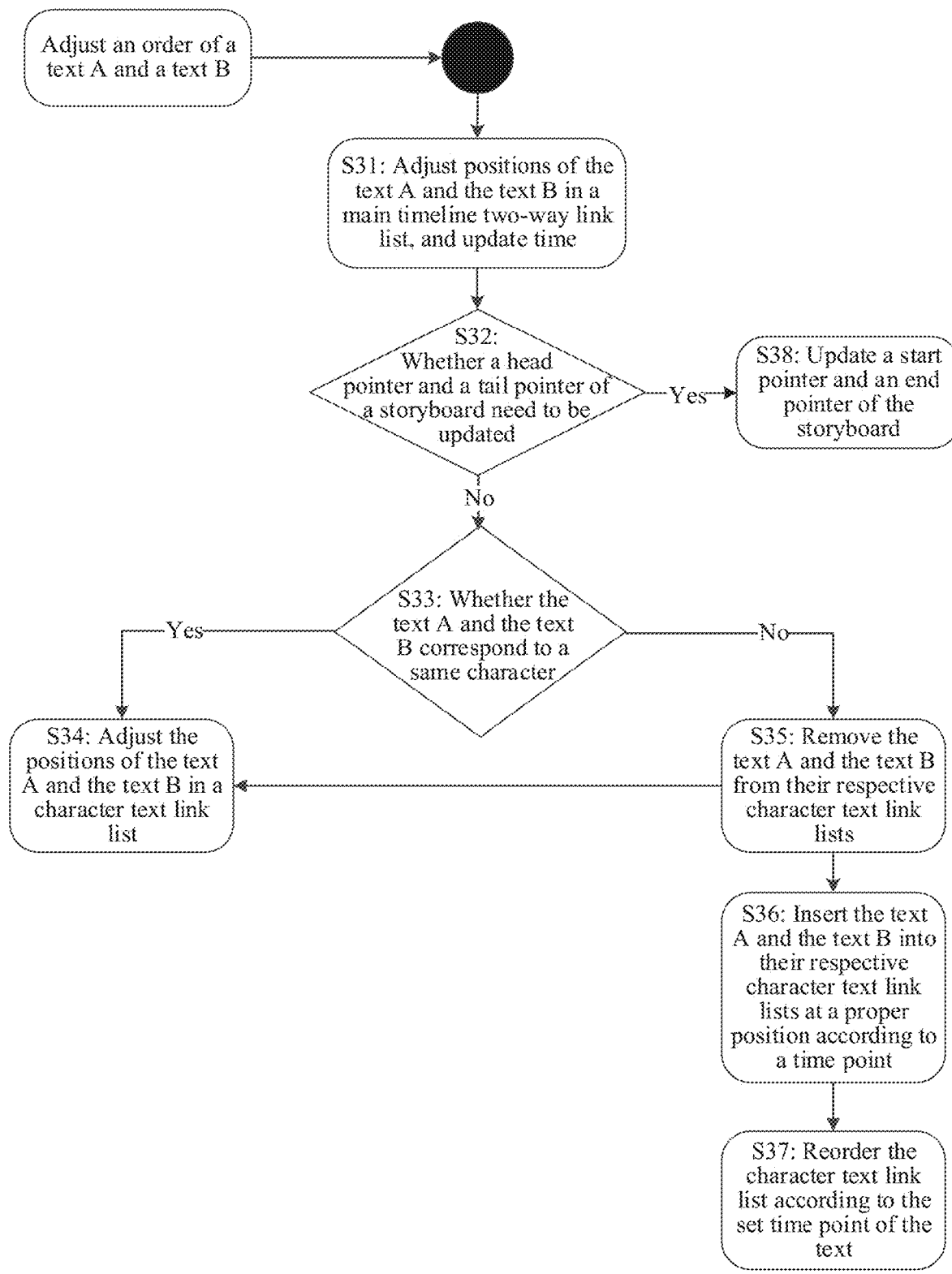
FIG. 11C is a schematic flowchart of another text editing operation according to an embodiment of this application.

FIG. 11C is a schematic flowchart of another text editing operation according to an embodiment of this application. The text editing operation may specifically include the following steps S31 to S38:

S31: Adjust positions of the text A and the text B in the main timeline two-way link list, and update the time.

S32: Determine whether the head pointer and the tail pointer of the storyboard need to be updated. If yes, perform S38; or if no, perform S33.

S33: Determine whether the text A and the text B correspond to a same character. If yes, perform S34; or if no, perform S35.

S34: Adjust the positions of the text A and the text B in the character text link list.

S35: Remove the text A and the text B from their respective character text link lists.

S36: Insert the text A and the text B into their respective character text link lists at a proper position according to a set time point.

S37: Reorder the character text link list according to the set time point of the text. For example, if a setting time point of the text A is 10:00 and a setting time point of the text B is 10:01, the text A may be set before the text B in the text two-way link list.

S38: Update a start pointer and an end pointer of the storyboard.

In summary, it may be learnt that in a process of editing the text, the main timeline two-way link list and their respective character two-way link lists are simultaneously maintained. Relying on the main timeline two-way link list, a sorted list of all texts in the animated video is obtained from top to bottom in chronological order. Relying on the character two-way link list, a text corresponding to a character may be quickly obtained. The multi-dimensional data link list manner may facilitate meeting service requirements of displaying the text in different service scenes.

Figure 12:
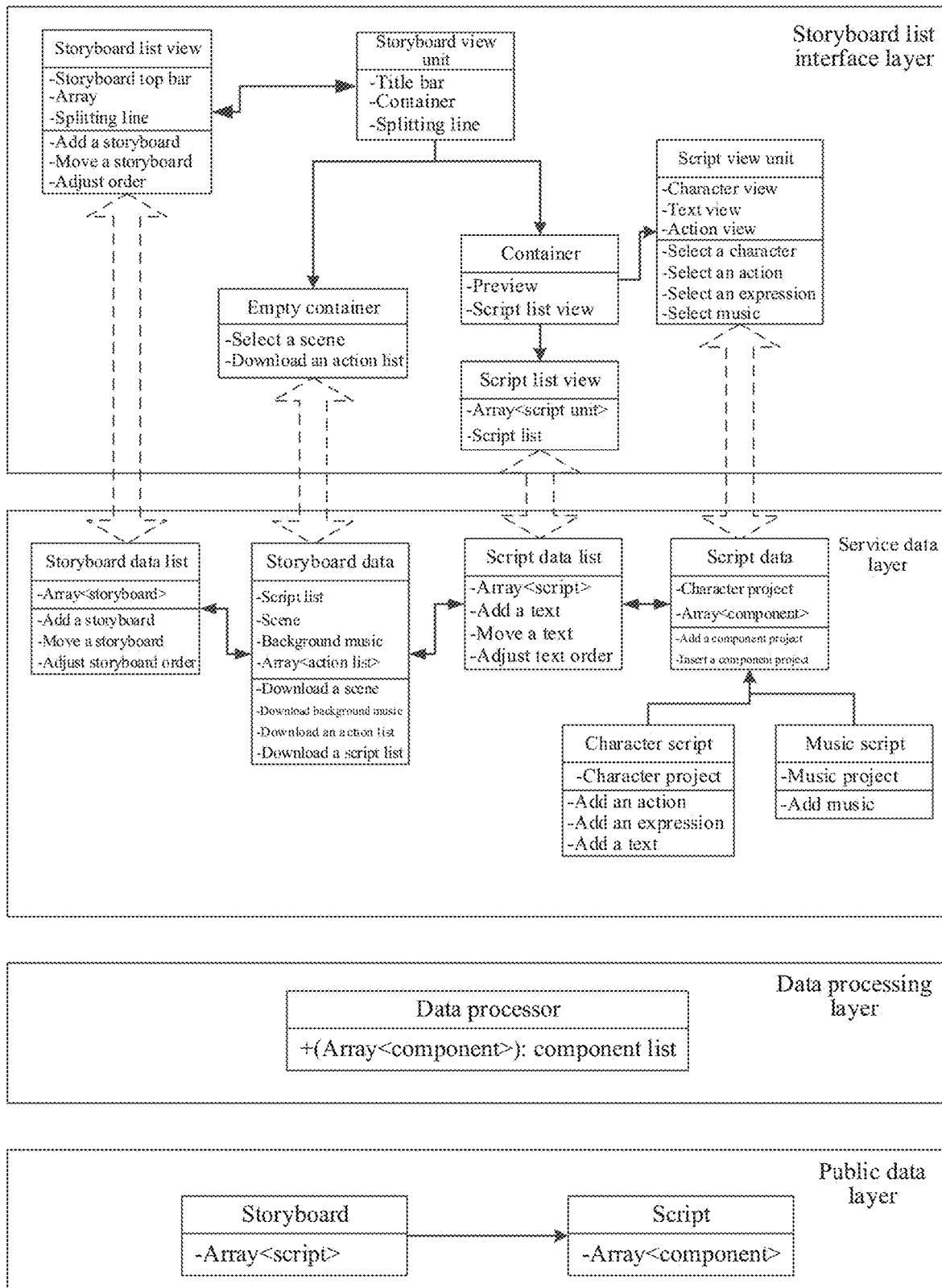
FIG. 12 is a technical architecture diagram of a script display area according to an embodiment of this application.

(6) Script Display Interface:

The script display interface mentioned above refers to an interface corresponding to the script display area (the script display area 5012 shown in FIG. 5A), and the script display interface supports being edited. FIG. 12 is a technical architecture diagram of a script display area according to an embodiment of this application. The technical architecture diagram mainly includes: a storyboard list interface layer (which shows a storyboard list, and the storyboard list includes at least one storyboard. As shown in FIG. 5A, the script display area 5012 displays a storyboard 1, a storyboard 2, and a storyboard 3) and a data layer (which may include a service data layer, a data processing layer, and a public data layer).

The storyboard list interface layer is in a one-to-one correspondence with the data layer, including: a storyboard list view being in a one-to-one correspondence with the storyboard data list, an empty container being in a one-to-one correspondence with the storyboard data, the script list view being in a one-to-one correspondence with the script data list, and the script view unit being in a one-to-one correspondence with the script data. In this way, a tree structure is formed according to a dependency chain.

a. A storyboard list view includes storyboard view units;
b. the storyboard view unit includes two types of containers, one is an empty container, and the so-called empty container refers to a container corresponding to initialized empty storyboard data; and the other is a container including a script list view;
c. a script list view is a view that supports scrolling and that includes a single script view unit; and d. the script view unit may be divided into a plurality of types, specifically related to a type of script data that the plurality of types are bound to, such as a character script, a narration script, and a music script.

The data layer is divided into three parts:

a. Service data layer: strongly related to the storyboard list interface layer, and provides a data source for the script display interface, where the so-called being strongly related to the storyboard list interface layer means that the service data layer includes many data attributes of the storyboard list interface layer, such as data corresponding to a highlighted text;

b. Data processing layer: configured for processing a process of data conversion between the service data layer and the public data layer; and c. Public data layer: configured for storing core data and data shared between a plurality of modules (a service data layer, a data processing layer, and a public data layer).

(7) Timeline Editing Panel:

In embodiments of this application, the timeline editing panel mainly involves the following content.

①Data conversion and data encapsulation are performed on the script data (such as a text corresponding to a line audio of each character as shown in FIG. 6C, and posture data corresponding to each character) displayed in the timeline editing panel.

②The timeline panel list is displayed, for example, a text and posture data of each character are displayed in the timeline editing panel, and the text and the posture data of each character are presented to the user in the form of a list. As shown in FIG. 6C, the timeline editing panel displays a text and posture data of a character A and a text and posture data of a character B, and the data may be presented in the timeline editing panel in the form of a list.

③ operations on the timeline editing panel may specifically include an adding operation, a deleting operation, and a modifying operation that are performed on the timeline editing panel. For example, in the timeline editing panel shown in the interface S608 in FIG. 6C, a text "I can't climb, I'm too tired" corresponding to the character B is modified to the text "Okay, let's keep fighting" shown in the interface S609; and for another example, the posture data "frowning" corresponding to the character A in the timeline editing panel shown in the interface S608 in FIG. 6C is deleted, and the like.

④ The foregoing operations (operations such as adding, deleting, modifying, and the like) performed on the timeline editing panel (the so-called callback refers to returning the detected result) are detected and called back, so that the renderer updates the corresponding UI interface (namely, the interface presented in the preview area) in real time based on the data after the callback.

⑤ The timeline (the timeline 6081 shown in FIG. 6C shows total duration corresponding to the current storyboard, for example, the total duration of the storyboard 1s is 4s) and a bottom bar (horizontal bar) inform joint adjustment. For example, as shown in FIG. 6C, if the user extends the background music (firecracker sound) of the storyboard 1 from the position of 1s to 2s on the timeline to the position of 1s to 4s, the corresponding horizontal bar for displaying the background music is also adaptively adjusted, thereby achieving joint adjustment between the timeline and the horizontal bar of the background music.

⑥ The storyboard data (which may include data determined after the foregoing detection and callback) is updated in real time, and the renderer is notified to perform joint adjustment of data. Specifically, after detecting that the corresponding operation is performed on the timeline editing panel corresponding to the current storyboard, the renderer is notified to update the image content in the preview area in real time, so that after the user performs an editing operation in the timeline editing panel, the corresponding image content may be simultaneously updated in the preview area, to achieve an effect of data linkage.

Figure 13A:
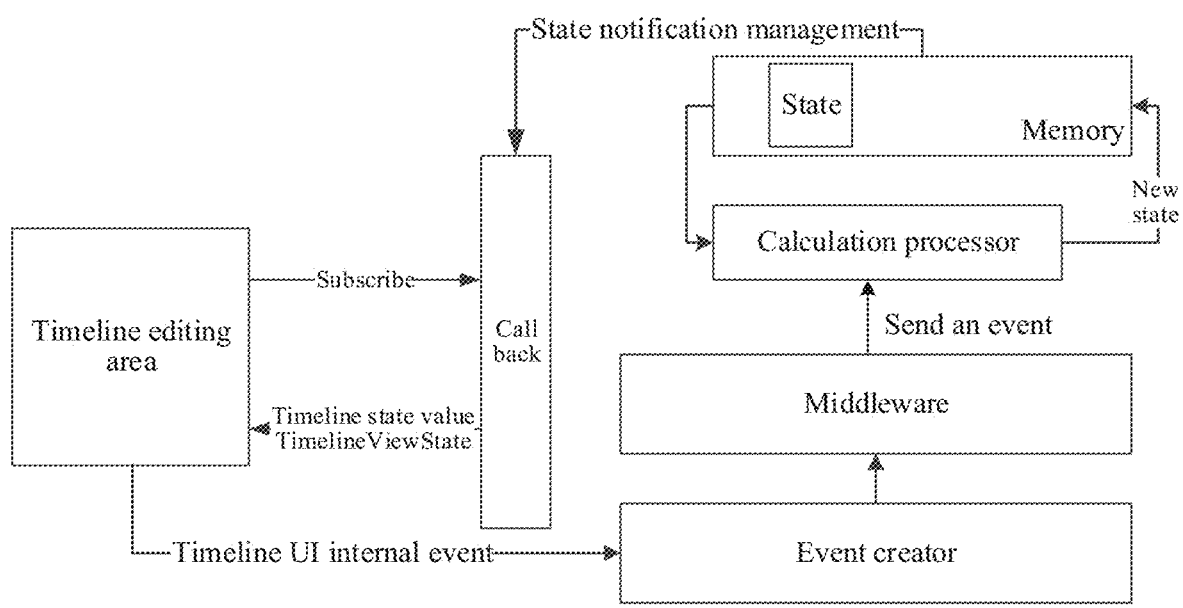
FIG. 13A is a schematic flowchart of timeline editing according to an embodiment of this application.

Next, the editing operations performed on the timeline editing panel according to an embodiment of this application are further described with reference to FIG. 13A and FIG. 13B. FIG. 13A is a schematic flowchart of timeline editing according to an embodiment of this application. As shown in FIG. 13A, when editing operations (operations such as adding, modifying, deleting, and the like) are detected in the timeline editing panel (namely, the timeline editing area), a timeline UI internal event may be generated, and the timeline UI internal event is notified to a middleware through an event creator, so that the middleware sends the timeline UI internal event to a calculation processor, and the calculation processor obtains, in response to the timeline UI internal event, a state value corresponding to the timeline UI internal event by calculation, and writes the calculated state value to the memory (store). Next, after a new state value is written into the memory, state notification management may be performed, and the state value (including the timeline state value Timeline ViewState) obtained by calculation is called back to the timeline editing area (Timeline View Area), thereby driving the timeline editing panel to perform state updating.

Figure 13B:
FIG. 13B is a schematic flowchart of another timeline editing according to an embodiment of this application.

FIG. 13B is a schematic flowchart of another timeline editing according to an embodiment of this application. As shown in FIG. 13B, the user may generate a clicking event after performing editing operation in the timeline editing panel. The clicking event may be sent to a timeline middleware for forwarding by a service party as a selected editing event, so that a timeline calculation processor and a menu calculation processor respectively calculate a timeline state and a menu state. Finally, the state obtained by calculation by each calculation processor is configured for notifying to modify the corresponding UI interface change. Specifically, after calculating the timeline state, the timeline processor notifies modification of a timeline view (a UI interface corresponding to the timeline editing panel is updated), and after calculating the menu state, the menu calculation processor notifies modification of the menu view.

2. Related Art Involved on a Server Side:

(1) Material Management Architecture.

In embodiments of this application, a process of performing video editing mainly involves "determining the target character and entering the text in the video editing interface". Related materials such as the determined target character, the input text, and the like need to be obtained from a server side. Therefore, embodiments of this application provide an architecture diagram of material management based on management of related materials.

Figure 14A:
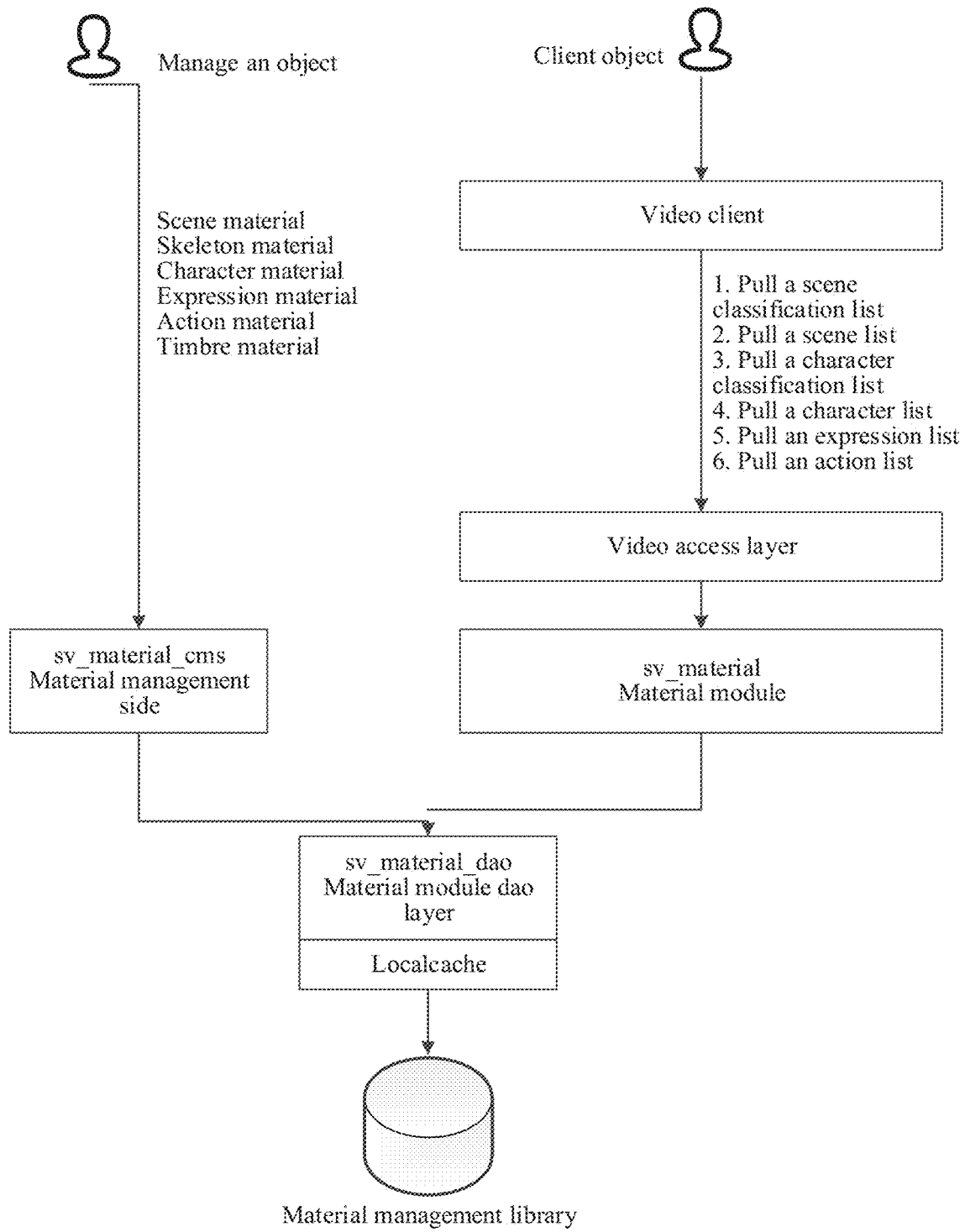
FIG. 14A is a schematic diagram of an architecture of material management according to an embodiment of this application.

FIG. 14A is a schematic diagram of an architecture of material management according to an embodiment of this application. As shown in FIG. 14A, a user (client object) on a terminal device side may perform video editing operation in a video editing interface displayed on a video client (for example, StoryVerse APP). For example, the video editing operation may specifically include: determining a target character, inputting a piece of text, setting posture data for the target character, and the like. The video client may pull a scene classification list, a scene list, a character classification list, a character list, an expression list, and an action list based on the video editing operation of the client object, and send the foregoing data to a video access layer, so that the video access layer sends the foregoing data to a material module (such as a material module dao layer) for material management.

In addition, a management object may send a scene material (configured for providing one or more scene images), a skeleton material (configured for providing Spine animation files corresponding to one or more characters), a character material (configured for providing one or more characters), an expression material (configured for providing one or more face postures), an action material (configured for providing one or more body actions), and a timbre type (configured for providing one or more timbres) to a material management side for material management. Finally, the material module dao layer may perform unified material management on related materials that are on the material management side and are involved in the material module, store the related materials locally in local cache, and write the related materials into a material management library.

(2) Abstract Processing of a Material Service Model.

Figure 14B:
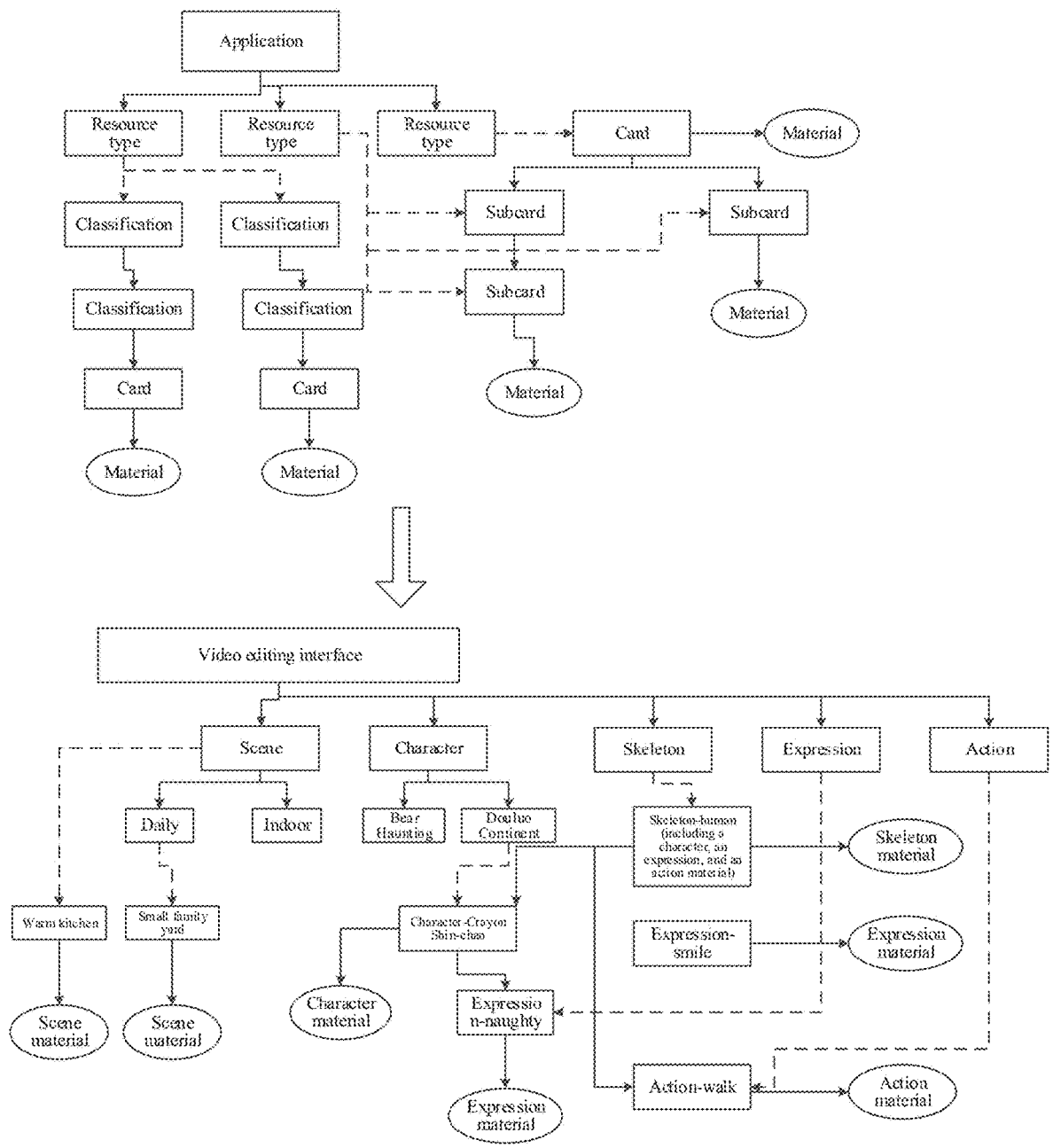
FIG. 14B is a schematic diagram of a structure of a material service model according to an embodiment of this application.

FIG. 14B is a schematic diagram of a structure of a material service model according to an embodiment of this application. As shown in FIG. 14B, the target character in the animated video may easily perform character replacement, switching of face postures, switching of body actions, and the like (for example, switch the target character in the animated video to a reference character; for another example, the face postures of the target character are switched from "happy" to "sad"; and for another example, a body action of the target character is switched from "rotating" to "lying down", and the like. In embodiments of this application, a "plugging and unplugging idea" may be used to allow the target character to replace characters and switch actions.

The so-called plugging and unplugging idea means that based on a basic skeleton (which may be provided by the skeleton material) corresponding to the target character, corresponding costume accessories may be added to the skeleton, or a new skeleton may be added. These newly added bones and costume accessories may also be "removed" from the current skeleton. In other words, the plugging and unplugging idea is mainly to facilitate adding and deleting of the bones and costume accessories in a manner of splicing.

Figure 14C:
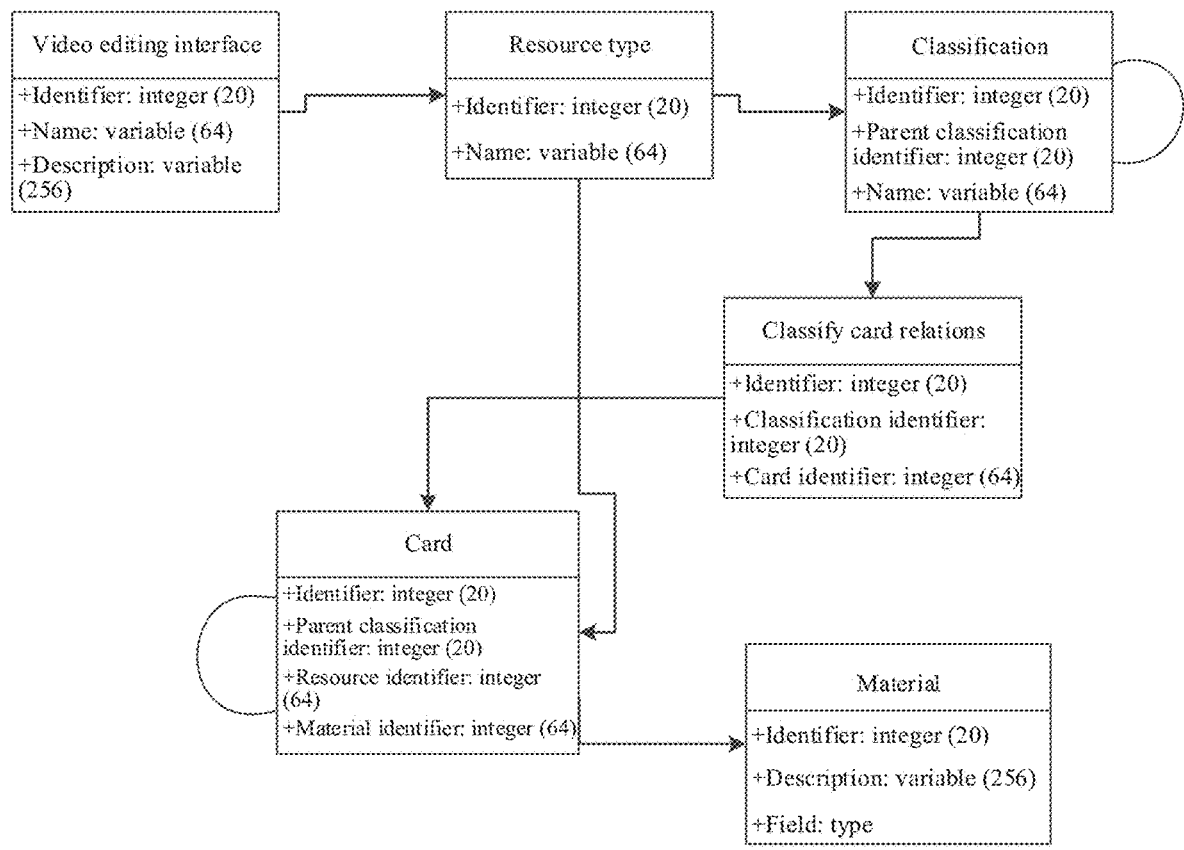
FIG. 14C is an abstract principle diagram of a material service model according to an embodiment of this application.

Based on the "plugging and unplugging idea" of the material service model shown in FIG. 14B, the material service model may be further abstracted. FIG. 14C is an abstract principle diagram of a material service model according to an embodiment of this application. A specific processes involved may include the following.

1. Abstractly classify resource types, to distinguish various types of materials. For example, the resource types may include but are not limited to: a character, a skeleton, an action (body action), an expression (face posture), music, and a timbre.
2. Each resource type supports further classification, for example, a scene type is classified into a daily type and an indoor type; and for another example, the character type is classified into a Bear Haunting type and a Douluo Continent type. Each resource type supports a tree structure in a classification process.
3. Cards: belong to a resource category, and are expressed as a specific resource instance. For example, resource instances corresponding to the character resource may include: Meow, Bear, Crayon Shin-chan, and the like; and for another example, resource instances corresponding to the expression resource may include: crying and laughing. The cards also need to support the tree structure.
4. Skeleton: for example, may include a character material, an action material, an expression material, and the like, where the action material is configured for providing resources for the target character to present body actions, and the expression material is configured for providing resources for the target character to present postures and expressions.
5. Materials: specific material resources that the video client needs to use. The material resources may be, for example, a picture, a compressed package (such as a zip package and a rar package), and the like. A data format of the material resources is not specifically limited in embodiments of this application.

It may be learned that in embodiments of this application, by abstractly classifying resource types, if a type of material is newly added, only one resource type needs to be newly added to achieve an effect of reusing the material service model, thereby reducing design costs.

Figure 15:
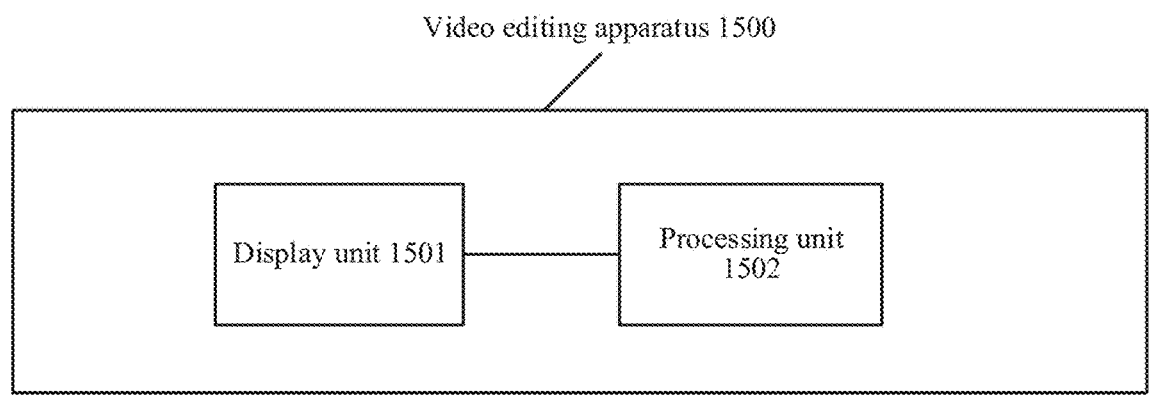
FIG. 15 is a schematic diagram of a structure of a video editing apparatus according to an embodiment of this application.

FIG. 15 is a schematic diagram of a structure of a video editing apparatus according to an embodiment of this application. The video editing apparatus 1500 may be a computer program (including program code) run in a computer device. For example, the video editing apparatus 1500 is an application software; and the video editing apparatus 1500 may be configured to perform corresponding steps in the methods provided in embodiments of this application. The video editing apparatus 1500 may include:

a display unit 1501, configured to display a video editing interface;

a processing unit 1502, configured to determine a target character and an input text in the video editing interface, the text being presented in the form of a text line in the video editing interface, and the video editing interface supporting editing of the text in the text line; and the processing unit 1502, further configured to generate an animated video, where the animated video includes the target character, and set a line audio corresponding to the text for the target character in the animated video, where in a process of playing the animated video, the line audio corresponding to the text is synchronously played when an image including the target character is played.

The operations performed by the processing unit 1502 may be described with reference to the foregoing method embodiments. Details are not described herein again.

Figure 16:
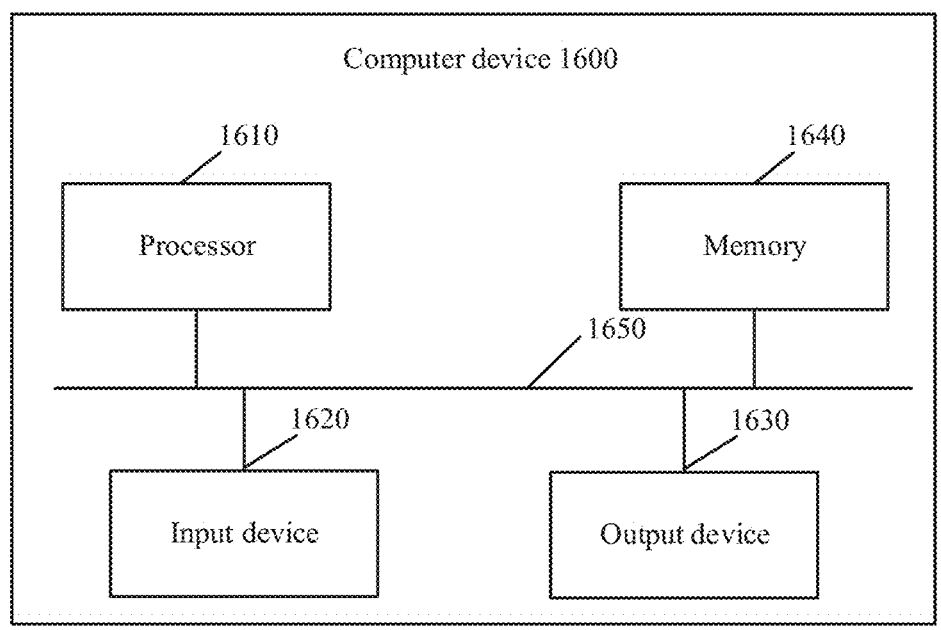
FIG. 16 is a schematic diagram of a structure of a computer device according to an embodiment of this application.

FIG. 16 is a schematic diagram of a structure of a computer device according to an embodiment of this application. The computer device 1600 is configured to perform the steps performed by the terminal device or the server in the foregoing method embodiments. The computer device 1600 includes: at least one processor 1610; at least one input device 1620, at least one output device 1630, and a memory 1640. The processor 1610, the input device 1620, the output device 1630, and the memory 1640 are connected through a bus 1650. The memory 1640 is configured to store a computer program. The computer program includes program instructions. The processor 1610 is configured to invoke the program instructions stored in the memory 1640, to perform various operations described in the foregoing embodiments.

In addition, embodiments of this application further provide a computer storage medium. The computer storage medium stores a computer program, and the computer program includes program instructions. When executing the program instructions, the processor may perform the method in the embodiments corresponding to the above. Therefore, details are not described herein again. For technical details that are not disclosed in the embodiment of the computer storage medium of this application, refer to the descriptions of the method embodiments of this application. In an example, the program instructions may be deployed to be executed on a computer device, or deployed to be executed on a plurality of computer devices at the same location, or deployed to be executed on a plurality of computer devices that are distributed in a plurality of locations and interconnected by a communication network.

According to one aspect of this application, a computer program product is provided. The computer program product includes a computer program. A processor of a computer device reads the computer program from the compute program product, and the processor may execute the computer program, to enable the computer device to perform the method in the foregoing embodiments corresponding to the above. Therefore, details are not repeated herein.

In a specific implementation of this application, related data such as object information (such as an identifier and a nickname of an object) are involved. When embodiments of this application are applied to specific products or technologies, object permission or consent needs to be obtained, and the collection, use, and processing of related data comply with related laws, regulations, and standards of related countries and areas.

A person of ordinary skill in the art may understand that all or some of the processes of the methods in the foregoing embodiments may be implemented by a computer program instructing relevant hardware. The program may be stored in a computer-readable storage medium. During execution of the program, processes of the foregoing method embodiments may be included. The foregoing storage medium may include a magnetic disc, an optical disc, a read-only memory (ROM), a random access memory (RAM), or the like.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules or units. Moreover, each module can be part of an overall module that includes the functionalities of the module or unit. What are disclosed above are merely examples of embodiments of this application, and certainly are not intended to limit the protection scope of this application. Therefore, equivalent variations made in accordance with the claims of this application shall fall within the scope of this application.

What is claimed is:

1. A method performed by a computer device for video editing, the method comprising:
    displaying a video editing interface;
    determining a target character and an input text in the video editing interface;
    generating an animated video comprising the target character;
    creating a line audio corresponding to the input text for the target character in the animated video based on the input text in the video editing interface; and
    synchronously playing the line audio corresponding to the input text in a process of playing the animated video.

2. The method according to claim 1, further comprising:
    highlighting the input text in images comprising the target character in a process of playing the line audio, wherein the highlighting comprises any one or more of the following: font enlarging display, font color changing display, and displaying according to a preset font.

3. The method according to claim 1, further comprising:
    setting posture data for the target character in the video editing interface, wherein the posture data is configured for controlling a posture of the target character presented in the animated video, and the posture comprises one or more of the following: a face posture and a body action.

4. The method according to claim 1, wherein the animated video comprises a first story board and a second story board; and the method further comprises:
    displaying a storyboard sequencing interface, wherein the story board sequencing interface comprises the first storyboard and the second storyboard, and the first story board and the second storyboard are arranged and displayed in the storyboard sequencing interface according to a playback order;
    changing an arrangement position of the first storyboard and/or an arrangement position of the second storyboard in the storyboard sequencing interface; and
    adjusting the playback order of the first storyboard or the second storyboard according to a changed arrangement position.

5. The method according to claim 1, wherein the animated video comprises at least one storyboard, and the method further comprises:
    displaying, in response to a dynamically modifying operation on a target storyboard, a timeline editing panel corresponding to the target storyboard; and
    modifying, on the timeline editing panel corresponding to the target storyboard, image content involved in the target storyboard, and updating the animated video based on the modification.

6. The method according to claim 1, further comprising:
    receiving a character switching operation, wherein the character switching operation is configured for switching the target character to a reference character; and
    replacing, in response to the character switching operation, the target character with the reference character, wherein
        the reference character is selected in a character selection panel displayed after an identifier of the target character is triggered; or
        the reference character is selected in a shortcut selector, and the shortcut selector is configured to display a plurality of character identifiers that reach a preset selection frequency in a preset time period.

7. The method according to claim 1, wherein a character management control is further set in the video editing interface; and the method further comprises:
    outputting a character management interface when the character management control is selected, wherein all characters comprised in the animated video and a management item for each character are displayed in the character management interface; and
    managing each character in the animated video according to the management item, wherein
        the management item comprises a character replacement item, and the management comprises character replacement; or the management item comprises a timbre changing item, and the management comprises changing a timbre of a line audio of a character.

8. The method according to claim 1, wherein the determining a target character in the video editing interface comprises:
triggering addition of the target character in the video editing interface when a character adding event is detected, wherein
the character adding event is generated by triggering a character adding entry;
or
the character adding event is generated after a character adding gesture is detected, and the character adding gesture comprises any one of: a single clicking gesture, a double clicking gesture, a floating gesture, and a preset gesture.

9. The method according to claim 1, wherein a plurality of historical videos are displayed in the video editing interface, and any historical video comprises at least one character; and
the determining a target character in the video editing interface comprises:
determining any character selected from the plurality of historical videos as the target character.

10. The method according to claim 1, wherein the video editing interface is displayed in a terminal device; and the method further comprises:
performing a video export operation on the animated video, wherein the video export operation comprises any one or more of the following: saving to the terminal device, releasing to a creator homepage of the animated video, and sharing to a social session.

11. A computer device comprising: a memory and a processor;
the memory storing one or more computer programs; and
the processor being configured to execute the one or more computer programs to implement a video editing method including:
displaying a video editing interface;
determining a target character and an input text in the video editing interface;
generating an animated video comprising the target character;
creating a line audio corresponding to the input text for the target character in the animated video based on the input text in the video editing interface; and
synchronously playing the line audio corresponding to the input text in a process of playing the animated video.

12. The computer device according to claim 11, wherein the video editing method further comprises:
highlighting the input text in images comprising the target character in a process of playing the line audio, wherein the highlighting comprises any one or more of the following: font enlarging display, font color changing display, and displaying according to a preset font.

13. The computer device according to claim 11, wherein the video editing method further comprises:
setting posture data for the target character in the video editing interface, wherein the posture data is configured for controlling a posture of the target character presented in the animated video, and the posture comprises one or more of the following: a face posture and a body action.

14. The computer device according to claim 11, wherein the animated video comprises a first storyboard and a second storyboard; and the video editing method further comprises:
displaying a storyboard sequencing interface, wherein the story board sequencing interface comprises the first storyboard and the second storyboard, and the first story board and the second storyboard are arranged and displayed in the storyboard sequencing interface according to a playback order;
changing an arrangement position of the first storyboard and/or an arrangement position of the second storyboard in the storyboard sequencing interface; and
adjusting the playback order of the first storyboard or the second storyboard according to a changed arrangement position.

15. The computer device according to claim 11, wherein the animated video comprises at least one storyboard, and the video editing method further comprises:
displaying, in response to a dynamically modifying operation on a target storyboard, a timeline editing panel corresponding to the target storyboard; and
modifying, on the timeline editing panel corresponding to the target storyboard, image content involved in the target storyboard, and updating the animated video based on the modification.

16. The computer device according to claim 11, wherein the video editing method further comprises:
receiving a character switching operation, wherein the character switching operation is configured for switching the target character to a reference character; and
replacing, in response to the character switching operation, the target character with the reference character, wherein
the reference character is selected in a character selection panel displayed after an identifier of the target character is triggered; or the reference character is selected in a shortcut selector, and the shortcut selector is configured to display a plurality of character identifiers that reach a preset selection frequency in a preset time period.

17. The computer device according to claim 11, wherein a character management control is further set in the video editing interface; and the video editing method further comprises:
outputting a character management interface when the character management control is selected, wherein all characters comprised in the animated video and a management item for each character are displayed in the character management interface; and
managing each character in the animated video according to the management item, wherein
the management item comprises a character replacement item, and the management comprises character replacement; or the management item comprises a timbre changing item, and the management comprises changing a timbre of a line audio of a character.

18. The computer device according to claim 11, wherein the determining a target character in the video editing interface comprises:
triggering addition of the target character in the video editing interface when a character adding event is detected, wherein
the character adding event is generated by triggering a character adding entry; or
the character adding event is generated after a character adding gesture is detected, and the character adding gesture comprises any one of: a single clicking gesture, a double clicking gesture, a floating gesture, and a preset gesture.

19. The computer device according to claim 11, wherein a plurality of historical videos are displayed in the video editing interface, and any historical video comprises at least one character; and the determining a target character in the video editing interface comprises:

determining any character selected from the plurality of historical videos as the target character.

20. A non-transitory computer-readable storage medium, storing a computer program, the computer program being adapted to be loaded by a processor of a computer device, to cause the computer device to perform a video editing method including:

displaying a video editing interface;

determining a target character and an input text in the video editing interface;

generating an animated video comprising the target character;

creating a line audio corresponding to the input text for the target character in the animated video based on the input text in the video editing interface; and synchronously playing the line audio corresponding to the input text in a process of playing the animated video.

* * * * *